(12) United States Patent
Nagavalli et al.

(10) Patent No.: US 11,604,075 B2
(45) Date of Patent: Mar. 14, 2023

(54) SYSTEMS AND METHODS FOR DERIVING PLANNED PATHS FOR VEHICLES USING PATH PRIORS

(71) Applicant: Woven Planet North America, Inc., Los Altos, CA (US)

(72) Inventors: Sasanka Nagavalli, Cupertino, CA (US); Sammy Omari, Los Altos, CA (US); Dor Shaviv, Redwood City, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 205 days.

(21) Appl. No.: 16/835,078

(22) Filed: Mar. 30, 2020

(65) Prior Publication Data
US 2021/0302187 A1   Sep. 30, 2021

(51) Int. Cl.
*G01C 21/34* (2006.01)

(52) U.S. Cl.
CPC ..... *G01C 21/3492* (2013.01); *G01C 21/3446* (2013.01)

(58) Field of Classification Search
CPC ...... G01C 21/00; G01C 21/005; G01C 21/04; G01C 21/10; G01C 21/16; G01C 21/165; G01C 21/188; G01C 21/20; G01C 21/26; G01C 21/05; G01C 21/28; G01C 21/30; G01C 21/32; G01C 21/34; G01C 21/3407; G01C 21/3415; G01C 21/03; G01C 21/446; G01C 21/3453; G01C 21/3461; G01C 21/38; G01C 21/3807; G01C 21/3811; G01C 21/3815; G01C 21/3819; G01C 21/3841; G01C 21/3867; G01C 21/387; G01C 21/3878; G01C 21/3885; G01C 21/3896; G01C 21/3492; G01C 21/3446; G01C 21/343; G01C 21/265;
(Continued)

(56) References Cited

U.S. PATENT DOCUMENTS 10,421,453 B1 *  9/2019  Ferguson .......... B60W 30/0953
11,079,245 B1 *  8/2021  Niewiadomski ... G01C 21/3492
(Continued)

FOREIGN PATENT DOCUMENTS

EP    2172748 A2 *  4/2010  ............ G01C 21/32
KR    102005203 B1    7/2019

OTHER PUBLICATIONS

International Searching Authority, International Search Report and Written Opinion, PCT/US2021/024713, dated Jul. 6, 2021, 10 pages.

*Primary Examiner* — Adam R Mott
*Assistant Examiner* — Erick T. Detweiler
(74) *Attorney, Agent, or Firm* — Christopher G. Darrow; Darrow Mustafa PC

(57) ABSTRACT

Disclosed herein is technology for deriving a planned path for a vehicle that is operating in a geographic area. In an example embodiment, a computing system associated with the vehicle may function to (i) identify a set of path priors to use as a basis for deriving the planned path for the vehicle in the geographic area, (ii) sample path priors in the identified set of path priors and thereby producing a set of points that is representative of the identified set of path priors, (iii) fit a curve to the set of points produced by the sampling, and (iv) derive the planned path for the vehicle based on the fitted curve.

20 Claims, 14 Drawing Sheets

(58) Field of Classification Search
CPC ............ G01C 21/3476; G01C 21/3484; G01C 21/3804; G01C 21/3833; G01C 21/3837; G01C 21/3852; G01C 21/3856; G01C 21/3859; G01C 21/3863; G01C 21/3874; G01C 21/3889; G01C 21/3893; G05D 1/00; G05D 1/0055; G05D 1/0061; G05D 1/0088; G05D 1/02; G05D 1/021; G05D 1/0212; G05D 1/0214; G05D 1/0231; G05D 1/0246; G05D 1/0251; G05D 1/0253; G05D 1/0255; G05D 1/0257; G05D 1/07; G05D 1/0274; G05D 1/0276; G05D 1/0278; G05D 1/0282; G05D 1/0285; G05D 1/0287; G05D 1/0291; G05D 1/95; G05D 1/0297; G05D 1/0891; G05D 1/10; G05D 1/0221; G05D 1/0223; G05D 1/0268; G05D 1/027; G05D 1/0293; G05D 1/0295
See application file for complete search history.

(56) References Cited

U.S. PATENT DOCUMENTS

| | | | |
|---|---|---|---|
| 11,199,853 B1* | 12/2021 | Afrouzi | G05D 1/0246 |
| 11,200,807 B2* | 12/2021 | Beaurepaire | G08G 1/14 |
| 2018/0066957 A1* | 3/2018 | Stroila | G01C 21/3446 |
| 2019/0322275 A1 | 10/2019 | Ondruska et al. | |
| 2020/0089973 A1 | 3/2020 | Efland | |
| 2020/0125106 A1* | 4/2020 | Russell | G05D 1/0221 |
| 2020/0249028 A1* | 8/2020 | Fridin | G01C 21/3492 |
| 2020/0257301 A1* | 8/2020 | Weiser | G06N 3/02 |

* cited by examiner

SYSTEMS AND METHODS FOR DERIVING PLANNED PATHS FOR VEHICLES USING PATH PRIORS

BACKGROUND

Vehicles are increasingly being equipped with technology that enables them to monitor their surrounding environment and perform certain tasks with little or no human input, as appropriate. For instance, vehicles may be equipped with (i) sensors that are configured to capture various types of sensor data that is representative of the vehicle's surrounding environment, (ii) an on-board computing system that is configured to perform functions such as perception of the vehicle's surrounding environment (including object detection), prediction of future object behavior, and planning of the vehicle's future behavior, and (iii) actuators that are configured to control the physical behavior of the vehicle, among other possibilities.

SUMMARY

In one aspect, the disclosed technology may take the form of a method that involves (i) while a vehicle is operating in a geographic area, identifying a set of path priors to use as a basis for deriving a planned path for the vehicle in the geographic area, (ii) sampling path priors in the identified set of path priors and thereby producing a set of points that is representative of the identified set of path priors, (iii) fitting a curve to the set of points produced by the sampling, and (iv) deriving the planned path for the vehicle based on the fitted curve.

In example embodiments, the function of identifying the set of path priors to use as the basis for deriving the planned path for the vehicle in the geographic area may involve (i) selecting a sequence of road segments that the planned path is to traverse, (ii) identifying a respective subset of path priors associated with each road segment in the selected sequence, and (iii) combining the respective subsets of path priors associated with the road segments in the selected sequence into the identified set of path priors.

Further, in example embodiments, the function of fitting the curve to the set of points produced by the sampling function may involve fitting the curve to the set of points to achieve a balance between minimizing a deviation from the set of points and minimizing a curvature of the curve, and the fitted curve resulting from this function may comprise a cubic smoothing spline, among other possibilities.

Further yet, in example embodiments, the method may additionally involve, before sampling the path priors in the identified set of path priors, filtering the identified set of path priors based on a comparison between (i) contextual information related to the path priors in the identified set of path priors and (ii) contextual information related to the operation of the vehicle in the geographic area, and wherein sampling the path priors in the identified set of path priors comprises sampling the path priors that remain in the identified set of path priors after the filtering. In these example embodiments, the function of filtering the identified set of path priors may involve (i) obtaining data related to the operation of the vehicle for at least one given contextual variable, (ii) for each path prior in the identified set of path priors: (a) accessing metadata for the at least one given contextual variable, (b) comparing the accessed metadata to the obtained data for the at least one given contextual variable, and (c) identifying the path prior for removal if there is a mismatch between the accessed metadata and the obtained data for the at least one given contextual variable, and (iii) removing each path prior identified for removal from the identified set of path priors. Further, in these example embodiments, the at least one given contextual variable may relate to one of (i) time-of-day, (ii) date, (iii) weather conditions, (iv) traffic conditions, (v) school-zone state, or (vi) geometry of an applicable sequence of road segments.

Further still, in example embodiments, the function of sampling the path priors in the identified set of path priors may take various forms. For instance, as one possibility, this function may involve using a sampling scheme that involves dynamically selecting a sampling rate to apply to each respective path prior in the identified set of path priors based on contextual information related to the operation of the vehicle in the geographic area, which may relate to one or more of (i) time-of-day, (ii) date, (iii) weather conditions, (iv) traffic conditions, (v) school-zone state, or (vi) a geometry of the selected sequence of road segments. As another possibility, this function may involve sampling the path priors in the identified set of path priors using a sampling scheme that involves dynamically selecting a sampling rate to apply to each respective path prior in the identified set of path priors based on information related to the respective path prior that may comprise one or more of (i) a geometry of a road segment that corresponds to the respective path prior, (ii) contextual information the respective path prior was recorded, or (iii) a confidence level associated with the respective path prior.

Additionally, in example embodiments, the function of identifying the set of path priors may involve defining path priors that are encoded into map data for the geographic area.

In another aspect, the disclosed technology may take the form of a non-transitory computer-readable medium comprising program instructions stored thereon that are executable to cause a computing system to carry out the functions of the aforementioned method.

In yet another aspect, the disclosed technology may take the form of an on-board computing system of a vehicle comprising at least one processor, a non-transitory computer-readable medium, and program instructions stored on the non-transitory computer-readable medium that are executable by the at least one processor such that the computing system is configured to carry out the functions of the aforementioned method.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

DETAILED DESCRIPTION

Figure 1:
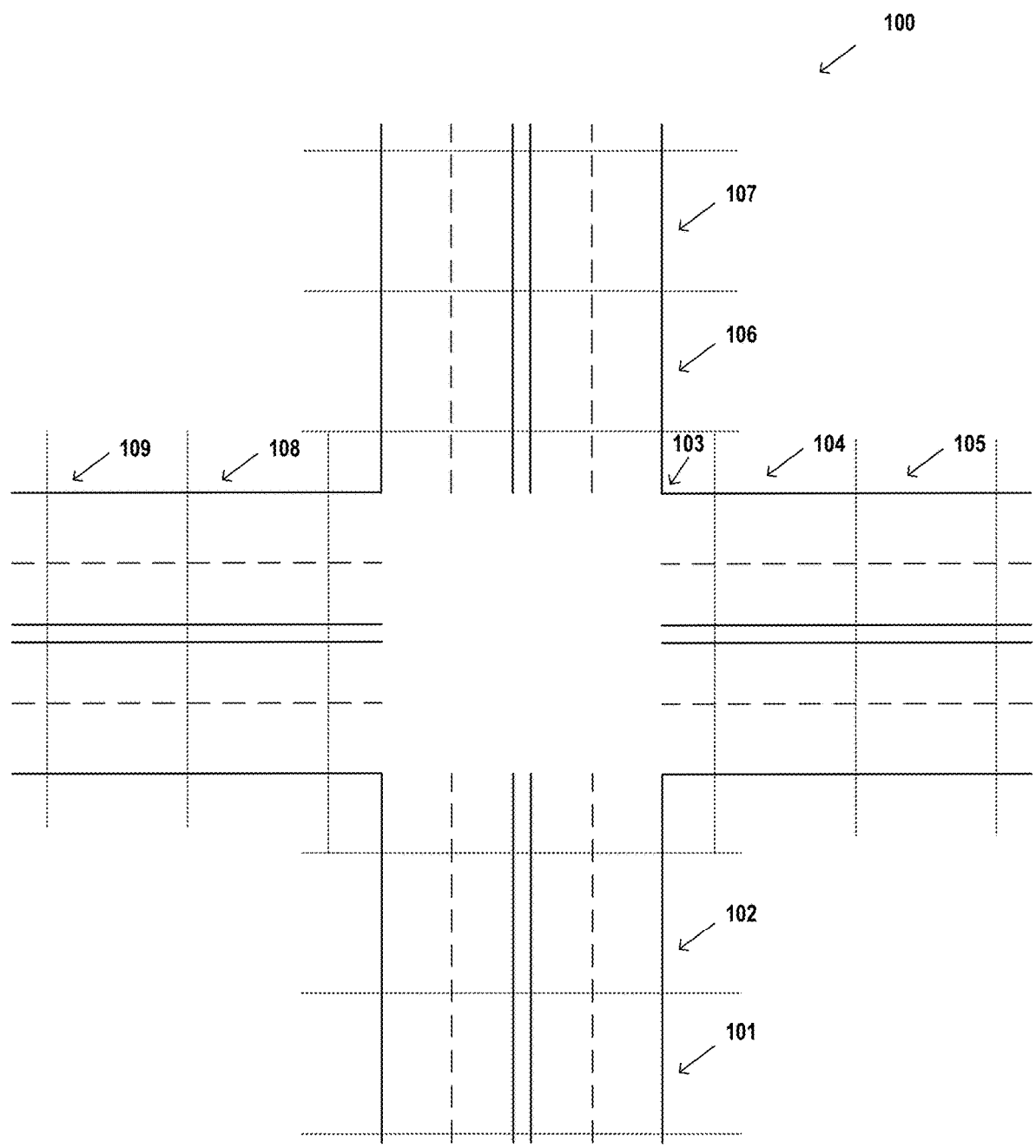
FIG. 1 is a diagram that illustrates a top-down view of a geographic area that is represented as a plurality of discrete road segments.

Vehicles are increasingly being equipped with technology that enables them to monitor their surrounding environment and perform certain tasks with little or no human input, as appropriate. For instance, such a vehicle may be equipped with (i) sensors that are configured to capture various types of sensor data that is representative of the vehicle's surrounding environment, (ii) an on-board computing system that is configured to perform functions that enable the vehicle to gain an understanding of its surrounding environment and then plan its behavior within that surrounding environment, and (iii) actuators that are configured to control the physical behavior of the vehicle, among other possibilities—all of which may collectively be referred to as the vehicle's "autonomy system." One possible example of a vehicle equipped with such technology may be a vehicle having some level of autonomous driving capability (e.g., a semi- or fully-autonomous vehicle), although it should be understood that other types of vehicles equipped with advanced driver assistance systems (ADAS) or the like could be equipped with aspects of this technology as well. For purposes of this disclosure, a vehicle that is equipped with such an autonomy system may be referred to as an "autonomous vehicle" (or "AV" for short)," regardless of whether that vehicle is being driven autonomously, semi-autonomously, or manually at any given time.

In general, an AV's on-board computing system may be configured to (i) process and analyze various data related to the AV's surrounding environment and its operation therein (e.g., sensor data, map data associated with the AV's location, etc.), (ii) derive a behavior plan for the AV that defines the desired driving behavior of the AV during some future window of time (e.g., over the next 5 seconds), and then (iii) output control signals for executing the derived behavior plan to a set of actuators that are configured to control aspects of the AV's physical behavior, such as steering, acceleration, and braking. Notably, the AV's on-board computing system typically performs these functions in a repeated manner, such as many times per second, so that the AV is able to continually update both its understanding of the surrounding environment and its planned behavior within that surrounding environment.

The behavior plan that is derived for an AV typically includes a planned trajectory for the AV, which may take the form of a time-sequence of planned states for the AV at several future times (e.g., each second over the next 5 seconds). In this respect, the planned state for the AV at each future time may include various types of state information for the AV, examples of which may include a planned position of the AV at the future time, a planned orientation of the AV at the future time, a planned velocity of the AV at the future time, and/or a planned acceleration of the AV (whether positive or negative) at the future time, among other possibilities.

The function of deriving a planned trajectory for an AV may involve various aspects and take various forms. For instance, in at least some implementations, the function of deriving a planned trajectory for an AV may involve an initial determination of at least one planned path for the AV—which generally comprises a geometric path to be traveled by the AV that is independent of time—and this planned path then be used as a basis for deriving the time-sequence of planned states that make up the planned trajectory for the AV. In this respect, a planned path for an AV may be represented in various manners, examples of which may include a set of coordinates and/or a set of one or more equations that define a geometry of the planned path, among other possibilities.

In practice, an AV's on-board computing system may derive a planned path for an AV based on a combination of sensor data and map data for the geographic area in which the AV is located, among other possibilities. For instance, in addition to the sensor data captured by the AV's sensors, the AV's on-board computing system may have access to geometric and/or semantic map data for the geographic area in which the AV is located, which may represent the network of roads in the geographic area in terms of a set of discrete "road segments," and the AV's on-board computing system may then use the geometric and/or semantic map data for a particular subset of road segments that are related to the AV's current location as a basis for deriving the planned path for the AV during some future window of time. The road segments that are defined by the map data for a given geographic area may take any of various forms.

One possible example of how a network of roads within a given geographic area may be represented in terms of road segments is depicted in FIG. 1. In particular, FIG. 1 illustrates a top-down view of a portion of a geographic area 100 comprising two roads that intersect with one another, and as shown, these roads may be represented in terms of road segments 101, 102, 103, 104, 105, 106, 107. 108, and 109. However, it should be understood that the road segments that represent a road network within a geographic area may take various other forms as well.

While an AV is operating within geographic area 100, the AV's on-board computing system may then derive a planned path to be traveled by the AV within geographic area 100 based on various types of data, including but not limited to data indicating the AV's current location within geographic area 100, data indicating the AV's desired destination, and map data for geographic area 100—which may include respective geometric and/or semantic map data for each of road segments 101, 102, 103, 104, 105, 106, 107, 108, and 109. For instance, as one possibility, the AV's on-board computing system may derive the planned path of the AV based on such data by (i) selecting a particular sequence of road segments within geographic area 100 that are to be traveled by the AV from that point forward and then (ii) using the geometric and/or semantic map data for the particular sequence of road segments along with other data related to the AV's operation in geographic area 100 (e.g., data indicating the objects perceived by the AV in geographic area 100) to derive the planned path of the AV.

Figure 2A:
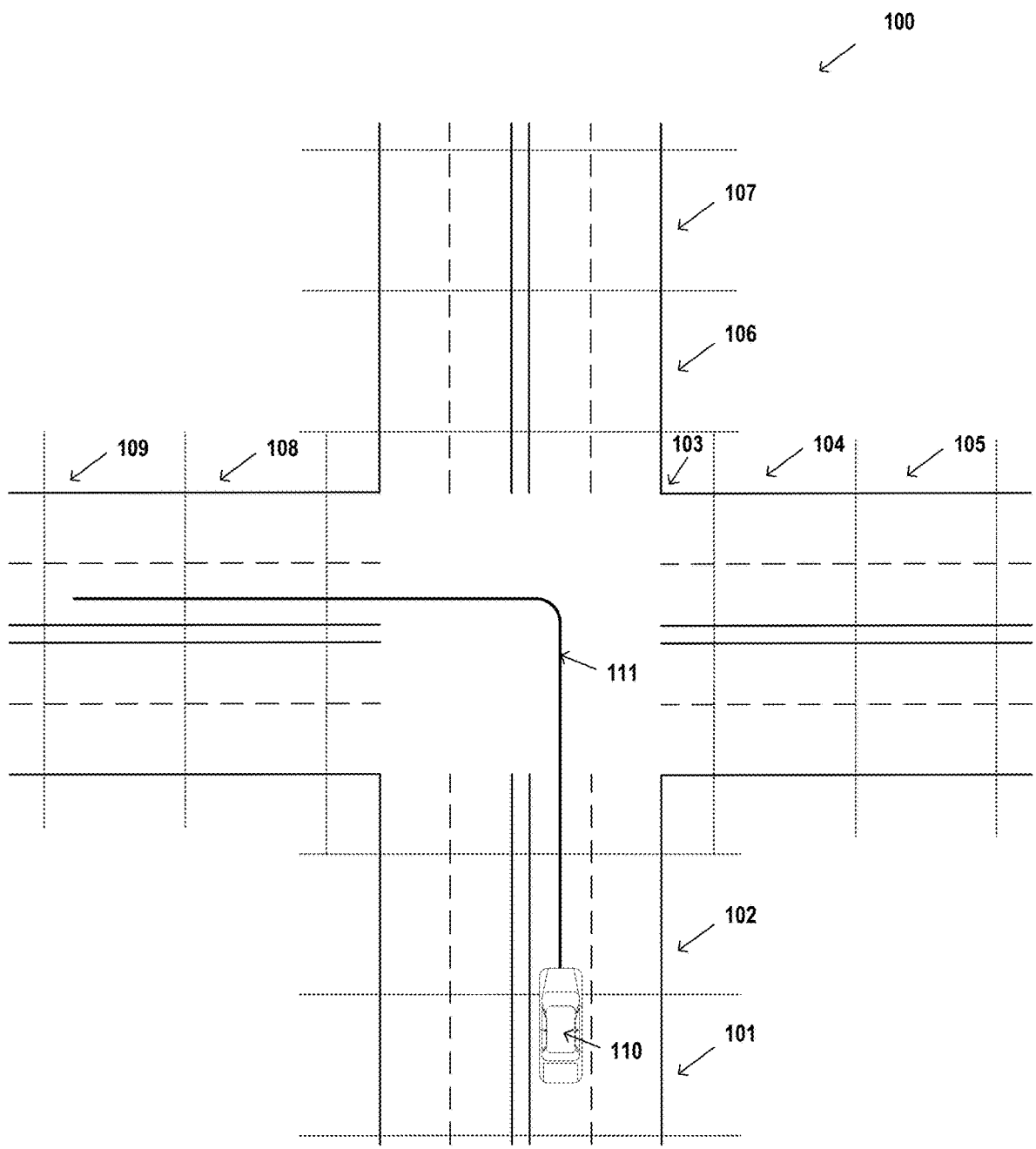
FIGS. 2A-B are diagrams that illustrate a top-down view of the geographic area of FIG. 1 at a time when a vehicle operating in the geographic area functions to derive a planned path in accordance with existing approaches and then implement a planned trajectory that is based on this planned path.

One possible example of this functionality is illustrated in FIG. 2A, which shows a planned path being derived for an example AV 110 that is operating within geographic area 100. As shown in FIG. 2A, while AV 110 is located at the border between road segments 101 and 102, the AV's on-board computing system engages in the function of deriving a planned path for AV 110 from that point forward. In this respect, as shown, the AV's on-board computing system may (i) determine that AV 110 is to traverse a sequence of road segments that comprises road segments 102, 103, 108, and 109 (in that order), and then (ii) use the geometric and/or semantic map data for road segments 102, 103, 108, and 109 along with other data related to the AV's operation in geographic area 100 to derive the planned path for the AV, which is shown in FIG. 2A as path 111.

After the AV's on-board computing system selects path 111 as the planned path for AV 110, the AV's on-board computing system may then use path 111 as a basis for deriving a planned trajectory for AV 110, which may comprise a time-sequence of planned states for AV 110 during some future window of time (e.g., the next 5 seconds). In this respect, the planned trajectory for AV 110 may comprise a path that is geometrically comparable to path 111 but also incorporates time-based state information that defines how AV 110 is to move along that path from one time point to another. Once the planned trajectory has been derived, AV 110 may then implement the planned trajectory, which may result in AV 110 traversing the path that is embodied by the planned trajectory. One example of this functionality is illustrated in FIG. 2B, which shows AV 110 implementing a planned trajectory that is derived based on path 111.

While the foregoing functionality generally enables an AV to derive and implement a planned trajectory that results in safe AV driving behavior, existing approaches for deriving a planned trajectory for an AV may still have limitations. One such limitation is that existing approaches for deriving the planned path that forms the basis for the AV's planned trajectory rely on factors that give little or no consideration to how a planned path will be perceived from the perspective of a human riding in the AV. For example, existing approaches for deriving a planned path often rely on the geometry of lane markings and/or lane boundaries for the selected road segments as the primary basis for deriving an AV's planned path. Because of this, existing approaches for deriving a planned path for an AV may have the potential to lead to "unnaturalistic" AV driving behavior that differs from how a human-driven vehicle would typically behave, which may degrade the experience of a human passenger riding in the AV. Some examples of this unnatural driving behavior may include unnatural turning behavior, unnatural lane-change behavior, and/or unnatural behavior when passing other objects in the AV's surrounding environment, among other possibilities. This unnatural driving behavior could occur at any of various places within a road network, but it may be especially pronounced when an AV is making a turn due to the fact that the AV can approach the turn in a number of different ways (e.g., sharply, gradually, acceleration points in the turn, braking during the turn, etc.) that may be considered acceptable from an AV's perspective but may be viewed much differently from a passenger's perspective. For instance, while sharper turns and more gradual turns may both be considered acceptable from an AV's perspective, the sharper turns may be more jarring and thus more unnaturalistic than the gradual turns from a passenger's perspective.

Figure 2B:
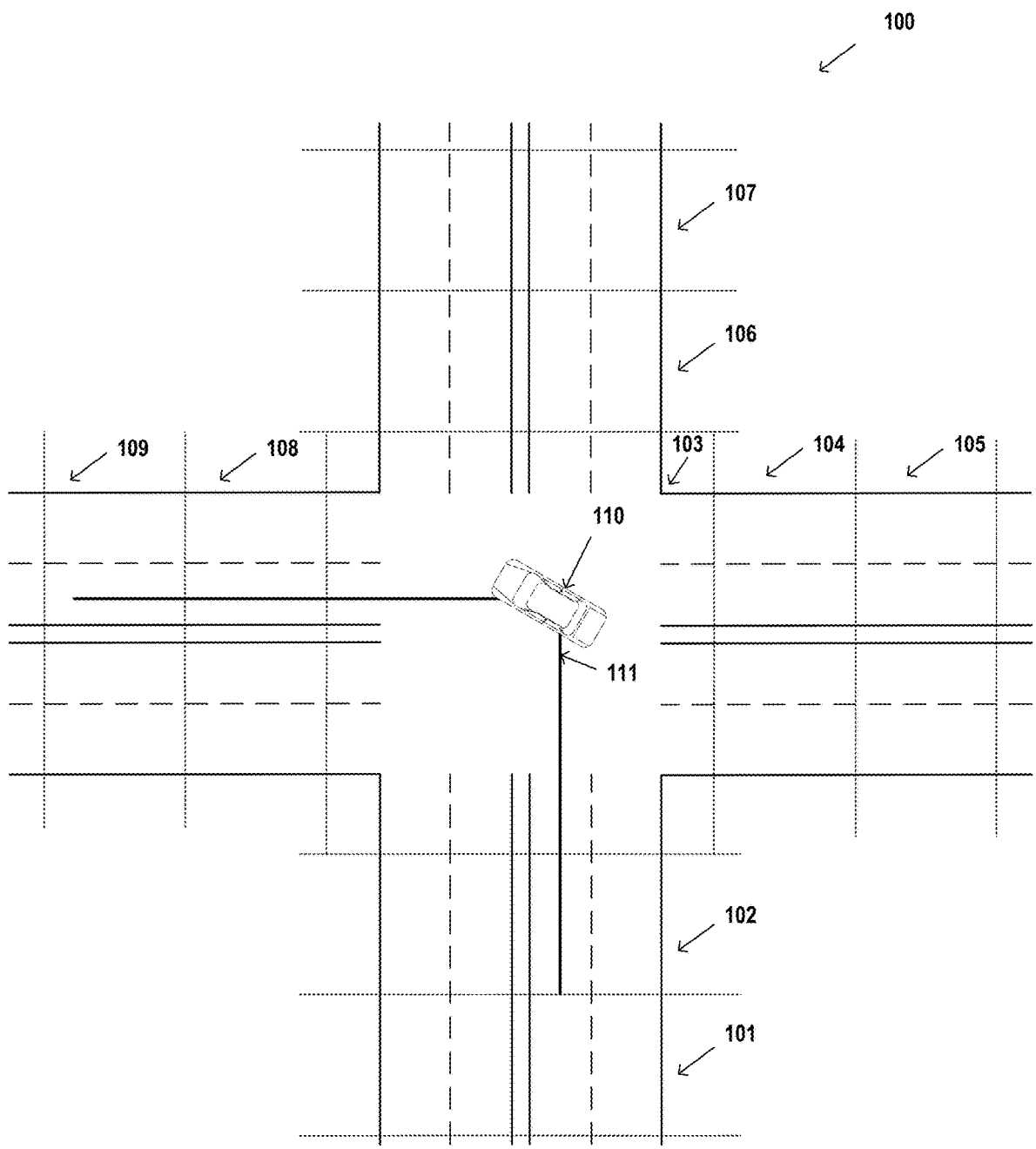

One possible example of unnaturalistic driving behavior that may result from existing approaches for deriving a planned path of an AV is illustrated in previously-discussed FIGS. 2A-B. Indeed, FIGS. 2A-B shows a planned path for AV 110 that takes the form of path 111, which has been defined based on the geometry of lane markings and/or lane boundaries for road segments 102, 103, 108, and 109 and results in AV 110 engaging in unnatural turning behavior (e.g., taking a sharp turn) that differs from how a human-driven vehicle would behave.

To address these and other problems, disclosed herein is a new technology for deriving planned paths for AVs that takes actual human-driving behavior into account when defining the geometry of the planned paths, which may in turn enable AVs to engage in more naturalistic driving behavior that may improve the experience of human passengers riding in such AVs.

At a high level, the disclosed technology may include two phases: (i) a "learning" phase during which "path priors" are collected for a geographic area is recorded, which are actual paths that were previously traversed by vehicles within the geographic area (or perhaps simulated versions thereof), and (ii) a "runtime" phase during which the path priors for the geographic area are used to derive a more naturalistic planned path for an AV operating in the geographic area.

The learning phase may generally involve (i) obtaining data that is indicative of trajectories for a geographic area, (ii) extracting the trajectories for the geographic area from the obtained data, (iii) using the extracted trajectories to derive path priors for the geographic area, and (iv) incorporating the path priors into (or otherwise associating such data with) map data for the geographic area.

In turn, the runtime phase may generally involve (i) while an AV is operating in the geographic area, identifying a set of path priors to use as a basis for deriving the AV's planned path (e.g., by selecting a sequence of road segments that the planned path is to traverse and then identifying a respective subset of path priors associated with each road segment in the selected sequence), (ii) optionally filtering the identified set of path priors based on contextual information related to the AV's current operation within the geographic area (e.g., time-of-day, date, weather conditions, traffic conditions, geometry of the selected sequence of road segments, etc.), (iii) sampling at least some of the path priors included in the identified set of path priors (e.g., the path priors that remain after filtering) and thereby producing a set of points that is representative of the identified set of path priors, (v) fitting a curve to the set of points produced by the sampling, and then (vi) using the fitted curve as a basis for deriving the planned path for the AV (which may in turn be used to derive the planned trajectory for the AV).

In practice, the learning phase of the disclosed technology may be carried out by a remote data processing system and the runtime phase of the disclosed technology may be carried out by an on-board computing system of the AV, although other implementations are possible as well.

Example embodiments of the disclosed technology for deriving a planned path for an AV using path priors from actual human-driving behavior will now be described with reference to FIGS. 3 and 4. For instance, referring first to FIG. 3, a functional block diagram 300 is shown that depicts one example embodiment of a learning phase of the disclosed technology, which generally involves obtaining trajectories for a geographic area and then making such trajectories available for use by AVs operating in the geographic area. For purposes of illustration, the example functions are described as being performed by data processing system 701 of FIG. 7, but it should be understood that a computing system other than data processing system 701 may perform the example functions. Likewise, it should be understood that the disclosed process is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

Figure 3:
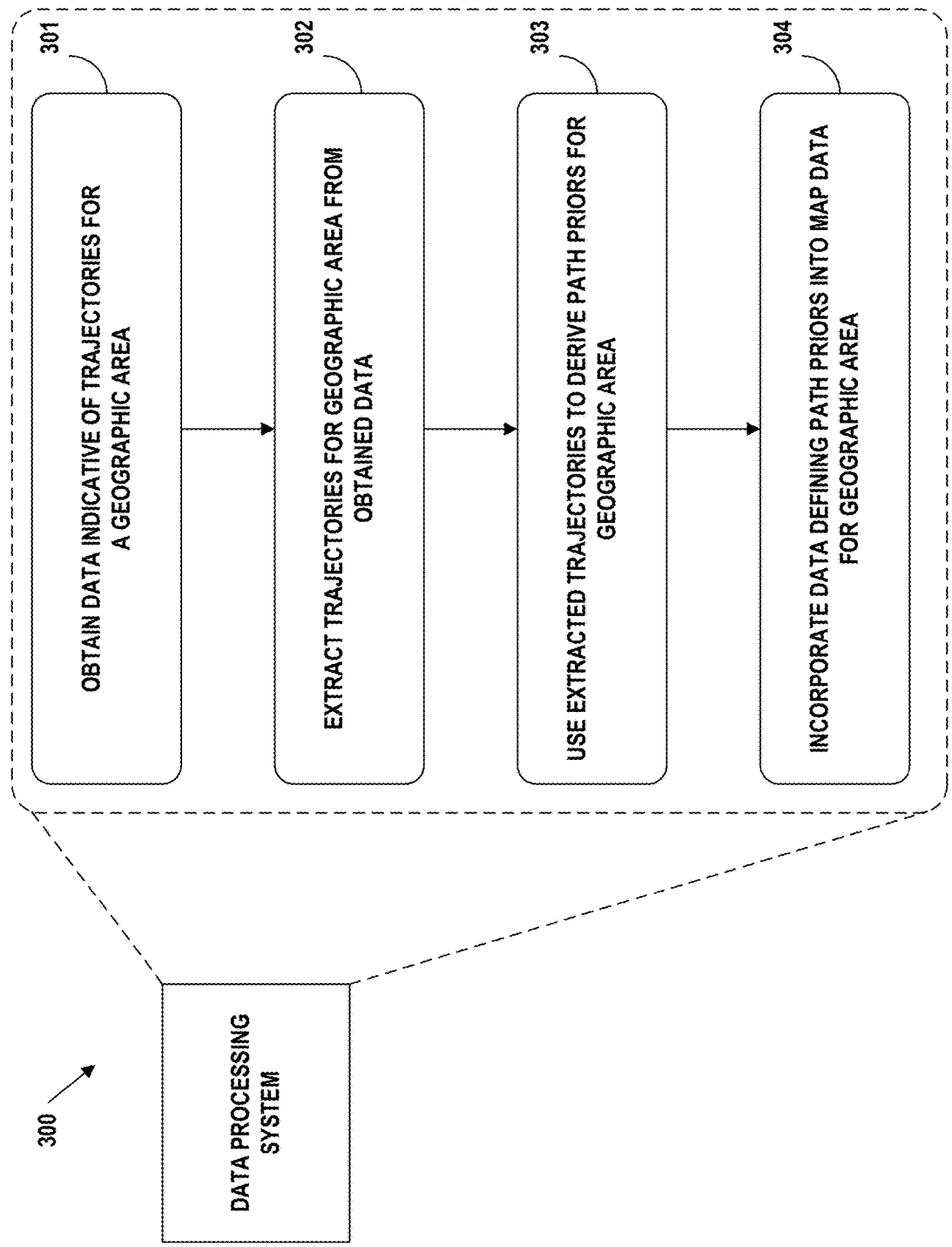
FIG. 3 is a functional block diagram that illustrates an example embodiment of the learning phase of the present disclosure.

As shown in FIG. 3, the learning phase may begin at block 301 with a data processing system obtaining data indicative of trajectories for the geographic area, such as real-world trajectories that were previously traversed by vehicles (e.g., human-driven vehicles) within the geographic area. In this respect, the data processing system may obtain the data indicative of the trajectories for the geographic area from various sources. For instance, as one possibility, the data processing system may obtain the data indicative of the trajectories for the geographic area from one or more human-driven collection vehicles, one example of which may take the form of collection vehicle 702 described below with respect to FIG. 7. As another possibility, the data processing system may obtain the data indicative of the trajectories for the geographic area from another data processing system (or the like) that has previously collected, processed, and/or otherwise generated the data indicative of the trajectories for the geographic area. As yet possibility, the data processing system may obtain the data indicative of the trajectories for the geographic area from a client station, such as client station 703 described below with respect to FIG. 7. Other sources of the data indicative of trajectories may also exist, including the possibility that the source of the data indicative of the trajectories may comprise a simulation program that has simulated the operation of vehicles within the geographic area.

Further, in practice, it should be understood that the data processing system may carry out function of obtaining the data indicative of the trajectories for the geographic area over the course of some period of time, in which case the data processing system may store the obtained data indicative of the trajectories for the geographic area in one or more data stores for future use.

Further yet, the obtained data indicative of the trajectories for the geographic area may take various forms. In one example, the data indicative of the trajectories for the geographic area may include sensor data captured by collection vehicles (which may driven by humans but could also engage in some level of autonomous operation) during times when such collection vehicles are operating in the geographic area, such as two-dimensional (2D) sensor data, and/or three-dimensional (3D) sensor data. In another example, the data indicative of the trajectories for the geographic area may include certain data that is derived by the collection vehicles based on the captured sensor data. In yet another example, the data indicative of the trajectories for the geographic area may include simulated data and/or user-created data that provides an indication of the trajectories for the geographic area. The obtained data indicative of trajectories for the geographic area may take other forms as well.

At block 302, the data processing system may extract the trajectories for the geographic area from the obtained data. In this respect, the function of extracting the trajectories may take various forms which may depend in part of the form of the obtained data. For instance, as one possibility, the function of extracting trajectories for the geographic area may involve using a technique such as Simultaneous Localization and Mapping (SLAM) to derive a time-ordered set of position and orientation (or "pose") values for each collection vehicle from 2D and/or 3D sensor data that is captured by the collection vehicle. In this respect, the pose values included in each trajectory could be either 2D pose values or 3D pose values. The function of extracting trajectories for the geographic area may take other forms as well.

In turn, at block 303, the data processing system may use the extracted trajectories to derive path priors for the geographic area. This function may take various forms.

As one possibility, the geographic area may be comprised of various different road segments, and the path priors that are derived for the geographic area may correspond to specific road segments within the geographic area. In this respect, the function of using the extracted trajectories to derive path priors for the geographic area may involve segmenting each extracted trajectory that traverses multiple road segments into two or more path priors that each correspond to a respective road segment within the geographic area. For instance, if a given trajectory traversed a given sequence of two or more road segments within the geographic area, the data processing system may function to (i) segregate the given trajectory's time-ordered set of 2D or 3D pose values out on a road segment-by-segment basis and then (ii) use the subset of pose values corresponding to each respective road segment in the given sequence of road segments to define a new path prior for the respective road segment. The function of segmenting a given trajectory that traverses multiple road segments into two or more path priors that each correspond to a respective road segment may take other forms as well.

Further, the function of using the extracted trajectories to derive path priors for the geographic area may involve generating a respective data element for each individual path prior that is defined, where such a data element may take various forms. For instance, at a minimum, a data element for an individual path prior may include data defining the individual path prior's geometry, such as a set of coordinates that define the geometry of the path prior and/or a set of one or more equations (e.g., parametric equations) that define the geometry of the path prior, among other possibilities. In addition, a data element for an individual path prior may also include other "metadata" that provides additional information about the individual path prior, which may take various forms. As one example, such metadata may provide information about a particular road segment or sequence of road segments that correspond to the individual path prior (e.g. a road segment ID and perhaps other geometric and/or semantic information for the road segment). As another example, the metadata for an individual path prior may provide information about the circumstances under which the individual path prior was recorded, which may be referred to herein as "contextual information" for the individual path prior. Such contextual information for the individual path prior could include information related to the time-of-day when the individual path prior was recorded, the date when the individual path prior was recorded, weather conditions when the individual path prior was recorded, traffic conditions when the individual path prior was recorded, the school-zone status when the individual path prior was recorded, and/or the geometry of particular sequence of road segments for which the path prior was recorded (e.g., straight ahead, left curvature, right curvature, etc.), among other possibilities. Further, in practice, such contextual information may be encoded in the data element as data values for a given set of contextual variables. As yet another example, the metadata for an individual path prior may include a confidence level associated with the individual path prior (e.g., a metric indicating a likelihood that the path prior is representative of normal human driving behavior). A data element for an individual path prior may take various other forms as well.

Further, the path priors may be organized in various ways. In one example, the path priors may be grouped (or otherwise associated) together on a road segment-by-segment basis, such that the data defining the path priors for the geographic area comprises a respective set of "path prior" data elements for each road segment included within the geographic area (or at least each of a subset of such road segments). However, the data elements for the individual path priors may be organized in other manners as well, including but not limited to the possibility that the data elements for the individual path priors may be grouped together based on geographic sub-areas other than road segments and/or the possibility that the data elements for individual path priors that correspond to the same road segment (or the like) of the geographic area may be combined together into a single data structure for that road segment.

As a result of the foregoing, the path priors that are defined for the geographic area may comprise a respective subset of path priors associated with each of a plurality of different road segments that are included in the geographic area (e.g., a first subset of path priors associated with a first road segment included in the geographic area, a second subset of path priors associated with a second road segment included in the geographic area, etc.). In this respect, depending on the extent of data that is available to the data processing system, a road segment could be associated with a respective subset of path priors that is comprised of any number of path priors—including as little as one path prior. However, in practice, the data processing system will preferably be configured to enough path priors such that each individual road segment is associated with a larger number of path priors (e.g., on the order of tens, hundreds, or even thousands) when possible, as using a larger number of path priors to derive an AV's planned path in accordance with the present disclosure has been found to result in planned paths that are more naturalistic than those derived using a smaller number of path priors. The path priors that are defined for the geographic area may take other forms as well, including but not limited to the possibility that path priors may be defined for geographic sub-areas other than road segments and/or the possibility that path priors may be defined for sequences of multiple road segments.

At block 304, the data processing system may incorporate data defining the path priors into map data for the geographic area. In this respect, the map data for the geographic area—and the function of incorporating the data defining the path priors into such map data—may take various forms.

For instance, as one possible implementation, the map data for the geographic area may comprise a respective "map element" for each road segment within the geographic area, which may generally include (i) identifying data for the road segment (e.g., a road segment ID, a set of geographic coordinates for the road segment, an indicator of whether the road segment is straight or curved, etc.), (ii) geometric data that defines the geometry of the road segment (e.g., 3D point cloud data), and perhaps also (iii) semantic data that defines semantic information about the road segment, such as information about static objects that are part of the road segment (e.g., lane boundaries, traffic lights, stop signs, etc.) and/or traffic-law information for the road segment, among other possibilities. In this respect, the function of incorporating the data defining the path priors into such map data may involve incorporating each road segment's associated set of "path prior" data elements into the map element for that road segment.

However, it should be understood that the map data for the geographic area may take various other forms as well, including but not limited to the possibility that the map data may be organized into map elements for geographic sub-areas other than road segments, in which case the function of incorporating the data defining the path priors into such map data may involve mapping the data defining the path priors to such map elements using metadata or the like.

Further, it should be understood that instead of incorporating the data defining the path priors into the map data, the data processing system may alternatively function to establish an association (e.g., a cross reference) between the data defining the path priors and the map data while maintaining such datasets separately. For example, the data processing system may include an identifier of a given road segment and/its map element as part of the metadata for each "path prior" data element that corresponds to the given road segment, where such an identifier may then provide a means for "looking up" the path priors that are associated with the map element for the given road segment. An association between the data defining the path priors for the geographic area and the map data for the geographic area may take other forms as well.

While one example embodiment of the disclosed learning phase has been discussed above, it should be understood that disclosed learning phase could take other forms as well.

Once the learning phase is completed, the data defining the path priors for the geographic area that is incorporated into (or otherwise associated with) the map data may then be provided to any computing system that is tasked with carrying out the runtime phase, which will typically comprise on-board computing systems of AVs (e.g., on-board computing system 602 of example AV 600 described below with respect to FIG. 6) but may also include other computing systems (e.g., remote computing systems that are in communication with AVs). In this respect, the data processing system may be configured to provide the data defining the path priors for the geographic area that is incorporated into (or otherwise associated with) the map data to such computing systems in various manners, including by transmitting such data to the computing systems via a communication network.

Figure 4:
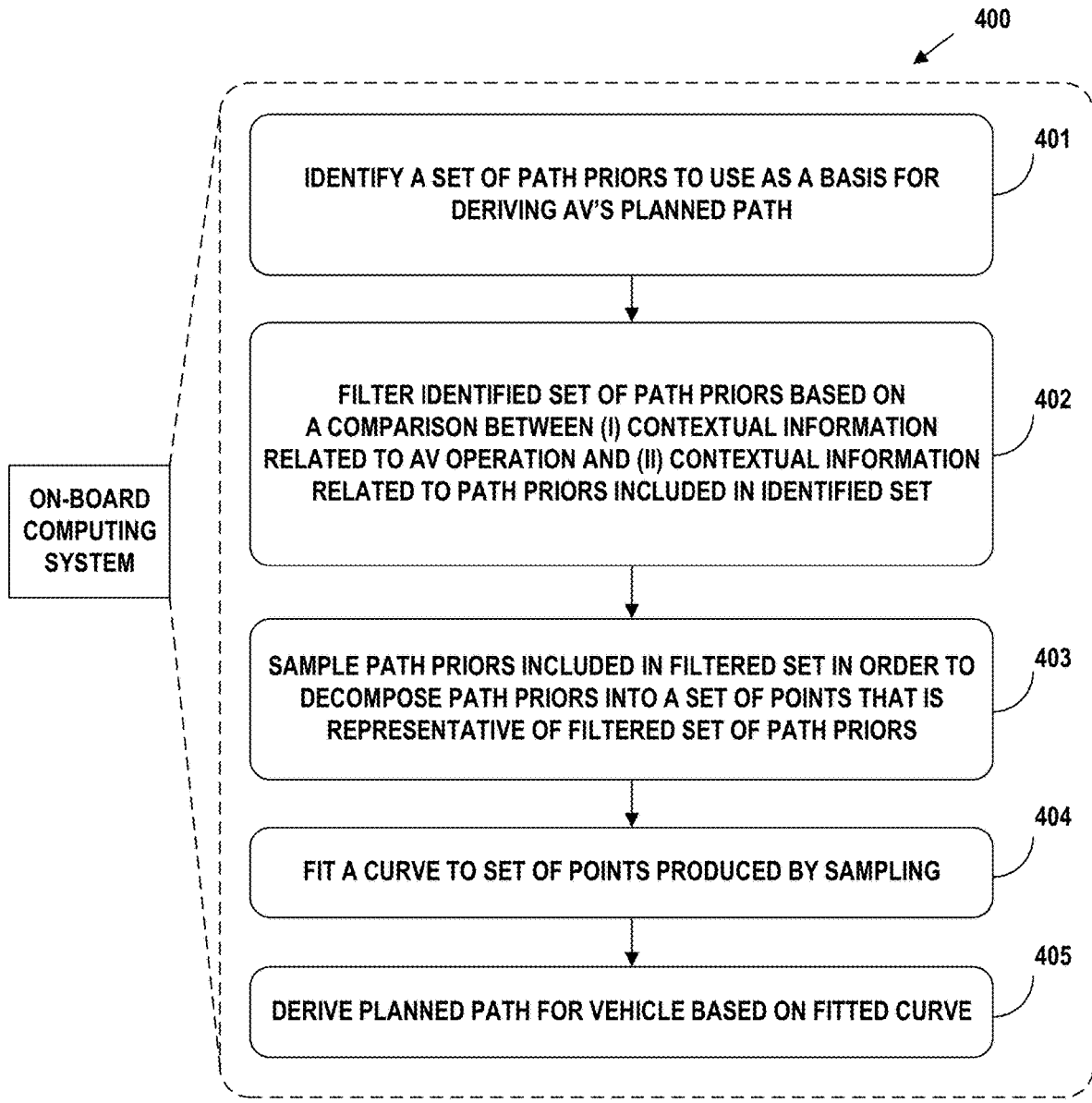
FIG. 4 is a functional block diagram that illustrates an example embodiment of the runtime phase of the present disclosure.

Turning now to FIG. 4, a functional block diagram 400 is shown that depicts one example embodiment of a runtime phase of the disclosed technology, which generally involves using data defining path priors for a geographic area to derive a planned path for an AV. For purposes of illustration, the example functions are described as being performed by on-board computing of an AV, such as on-board computing system 602 of example AV 600 described below with respect to FIG. 6 (e.g., as part of the functionality handled by planning subsystem 602c), but it should be understood that the example functions may generally be performed by any computing system that is tasked with deriving a planned trajectory for an AV. Likewise, it should be understood that the disclosed process is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

As shown in FIG. 4, an on-board computing system may carry out a given iteration of the runtime phase while an AV is operating within a geographic area, and the runtime phase may begin at block 401 with the on-board computing system identifying a set of path priors to use as a basis for deriving the AV's planned path. This function may take various forms.

In one implementation, the function identifying the set of path priors to use as a basis for deriving the AV's planned path may initially involve a selection of a sequence of road segments that the planned path is to traverse. For instance, the on-board computing system may select a sequence of road segments that includes the road segment on which the AV is currently driving, one or more road segments ahead of the AV, and perhaps also one or more road segments behind the AV, among other possibilities. In this respect, the particular number of road segments ahead of the AV and/or behind the AV that are included in the selected sequence could either be a static value or a dynamic value that varies based on certain data related to the AV's operation in the geographic area (e.g., the speed of the AV, the particular portion of the geographic area in which the AV is operating, etc.). The selected sequence of road segments may take other forms as well.

Further, the function of selecting the sequence of road segments may take various forms. For instance, as one possibility, the function of selecting the sequence of road segments may involve (i) obtaining certain data related to the AV's operation within the geographic area and then (ii) using the obtained data as a basis for selecting the sequence of road segments. In this respect, the obtained data related to the AV's operation within the geographic area may take various forms, examples of which may include geometric and/or semantic map data for the geographic area, data indicating a desired destination for the AV, data indicating a current and/or predicted future state of other objects in the geographic area that are perceived by the AV, and/or traffic data, among other possibilities.

After selecting the sequence of road segments that the planned path is to traverse, the on-board computing system may then identify a respective subset of path priors associated with each road segment in the selected sequence of road segments. In this respect, the function of identifying the respective subset of path priors associated with each road segment in the selected sequence of road segments may take various forms, which may depend in part on the form of the data defining the path priors for the geographic area.

For instance, as one possibility, the data defining the path priors for the geographic area may take the form of road-segment-specific subsets of path priors that have been incorporated into the map data for the geographic area, in which case the function of identifying the respective subset of path priors associated with each road segment in the selected sequence of road segments may involve accessing the map elements for each road segment in the selected sequence of road segments and then identifying the path priors that are included within such map elements.

As another possibility, the data defining the path priors for the geographic area may take the form of road-segment-specific subsets of path priors that are associated with but maintained separately from the map data for the geographic area, in which case the function of identifying the respective subset of path priors associated with each road segment in the selected sequence of road segments may involve using identifiers for each road segment in the selected road segments and/or their corresponding map elements to "look up" the path priors for each road segment the selected sequence of road segments.

The function of identifying a respective subset of path priors for each road segment in the selected sequence of road segments may take other forms as well.

After the on-board computing system identifies the respective subset of path priors associated with each road segment in the selected sequence of road segments, the on-board computing system may then combine the respective subset of path priors into the identified set of path priors to use as a basis for deriving the AV's planned path.

The on-board computing system may identify the set of path priors to use as a basis for deriving the AV's planned path in various other manners as well. For instance, it is possible that the identification of the set of path priors may be based on something other than a sequence of road segments that the planed path is to traverse, including but not limited to some other representation of the portion of the geographic area to be traversed by the AV's planned path or perhaps even a sequence of road segments from a different geographic area that is deemed to be comparable to the sequence of road segments that the planed path is to traverse, among other possibilities.

At block 402, after identifying the set of path priors, the on-board computing system optionally may filter the identified set of path priors based on a comparison between (i) information about the circumstances under which the AV is currently operating in the geographic area, which may be referred to herein as "contextual information" related to the current operation of the AV, and (ii) contextual information related to the path priors included in the identified set of path priors. In this respect, the contextual information related to the AV's current operation may take any of various forms. Some examples may include information related to current time-of-day (e.g., morning, afternoon, or night), current date (e.g., which day of the week, which day of the month, etc.), current weather conditions (e.g., temperature, precipitation state, etc.), current traffic conditions (e.g., low, medium, or high congestion), current school-zone status (e.g., whether the vehicle is operating in a school zone), and/or geometry of the selected sequence of road segments to be traversed by the AV (e.g., straight, left curvature, right curvature, etc.), among the possibilities. Further, in practice, such contextual information may be represented in the form of data values for a given set of contextual variables.

By performing this filtering function, the on-board computing system may be able to tailor the identified set of path priors used to derive the AV's planned path to only those path priors that are relevant to the circumstances currently being faced by the AV.

According to one implementation, the on-board computing system may begin the function of filtering the identified set of path priors by obtaining a set of contextual information related to the AV's current operation, which may take the form of current or recent data values for a set of contextual variables that relate to one or more of time-of-day, date, weather conditions, traffic conditions, school-zone status, and/or geometry of an applicable sequence of road segments. Next, for each path prior in the identified set of path priors, the on-board computing system may (a) access a set of contextual information for the path prior that takes the form of metadata for the set of contextual variables, and (b) compare the accessed set of contextual information for the path prior to the obtained set of contextual information related to the AV's current operation. Based on these comparisons, the on-board computing system may identify "matching" path priors that are to remain in the filtered set of path priors and identify "mismatching" path priors (e.g., any path prior having contextual information that does not "match" the obtained contextual information related to the AV's current operation) for removal from the filtered set of path priors. The on-boarding computing system may then remove, from the identified set of path priors, any path prior that has been identified as mismatching. In this respect, the comparison performed between the accessed set of contextual information for the path prior to the obtained set of contextual information related to the AV's current operation may take various forms.

For instance, as one possibility, the comparison performed between the accessed set of contextual information for the path prior to the obtained set of contextual information related to the AV's current operation may be based on a single contextual variable, in which case the on-board computing system may be configured to identify a path prior as a matching path prior if the path prior's metadata matches the obtained data related to the AV's current operation for that single contextual variable. To illustrate with one example, if the comparison is based on a precipitation-state variable and the obtained data for this precipitation-state variable indicates that the AV is currently experiencing a particular type of precipitation state (e.g., rain) while operating in the geographic area, then the "matching" path priors that remain in the identified set of path priors after the filtering function may include each path prior in the identified set that is associated with that same type of precipitation state. To illustrate with another example, if the comparison is based on a contextual variable that indicates a geometry of an applicable sequence of road segments and the obtained data for this contextual variable indicates that the applicable sequence of road segments for the AV has a geometry that involves a left turn, then the "matching" path priors that remain in the identified set of path priors after the filtering function may include each path prior in the identified set that was recorded for a sequence of road segments involving a left turn. Many other examples of comparisons based on a single contextual variable are possible as well.

As another possibility, the comparison performed between the accessed set of contextual information for the path prior to the obtained set of contextual information related to the AV's current operation may be based on multiple contextual variables, in which case the on-board computing system may be configured to identify a path prior as a matching path prior if either (i) the path prior's metadata matches the obtained data related to the AV's current operation for every one of multiple contextual variables (i.e., an "AND" Boolean operation) or (ii) the path prior's metadata matches the obtained data related to the AV's current operation for any one of multiple contextual variables (i.e., an "OR" Boolean operation). To illustrate with an example, if the comparison is based on a combination of a time-of-day variable and precipitation-state variable and the obtained data for these contextual variables indicates that the AV is currently operating in the geographic area during a particular of time-of-day (e.g., night) while experiencing a particular type of precipitation state (e.g., rain), then the "matching" path priors that remain in the identified set of path priors after the filtering function may include each path prior in the identified set of path priors that are associated with both the same time-of-day and the same type of precipitation state. Many other examples of comparisons based on multiple contextual variables are possible as well.

The function of filtering the identified set of path priors may take other forms as well, including but not limited to the possibility that the on-board computing system may filter the identified set of path priors based on other types of information in addition to or in alternative to contextual information.

As a result of the filtering function, the on-board computing system may then have a filtered set of path priors, which may include a respective subset of path priors for each road segment in the sequence of road segments that the planned path is to traverse. In this respect, the filtered set of path priors will still preferably include multiple path priors for each road segment in the selected sequence, but it is also possible that the filtered set of path priors could include as little as a single path prior for a road segment in the selected sequence.

At block 403, the on-board computing system may then sample the path priors included in the filtered set in order to decompose the path priors into a set of points that is representative of the filtered set of path priors. In this respect, the function of sampling the filtered set of path priors may generally involve (i) accessing data defining the geometry of each path prior included in the filtered set of path priors and then (ii) sampling the data defining the geometry of each path prior included in the filtered set in accordance with a particular type of sampling scheme, which may take various forms. Further, depending on the nature of the path priors included in the filtered set, the set of points resulting from the sampling may comprise either 2D or 3D points.

For instance, as one possibility, the on-board computing system may sample the path priors included in the filtered set in accordance with a sampling scheme that involves uniformly applying the same static sampling rate to each of the path priors in the filtered set, regardless of the current state of the AV's operation in the geographic area or the nature of the path priors being sampled. In this respect, the static sampling rate could be defined in terms of a number of sample points per some unit of distance (e.g., per foot, per mile, etc.) or a number of sample points per road segment, among other possibilities.

As another possibility, the on-board computing system may sample the path priors included in the filtered set in accordance with a sampling scheme that involves dynamically selecting a sampling rate to apply to the filtered set of path priors based on contextual information related to the AV's current operation in the geographic area and then uniformly applying the dynamically-selected sampling rate to each of the path priors in the filtered set. In this respect, the contextual information related to the AV's current operation that may be used as a basis for dynamically selecting the sampling rate may take any of various forms, examples of which may include data for contextual variables related to time-of-day, date, weather conditions, traffic conditions, school-zone status, and/or geometry of the selected sequence of road segments, among other possibilities. Further, as with the static sampling rate described above, the dynamically-selected sampling rate could be defined in terms of a number of sample points per some unit of distance (e.g., per foot, per mile, etc.) or a number of sample points per road segment, among other possibilities.

To illustrate with an example, while operating in accordance with this type of sampling scheme, the on-board computing system may function to dynamically select a higher sampling rate when the contextual information related to the AV's current operation in the geographic area indicates that the AV is facing a higher-risk situation (e.g., by operating at night and/or in the rain) and to dynamically select a lower sampling rate when the contextual information related to the AV's current operation in the geographic area indicates that the AV is facing a lower-risk situation (e.g., by operating during the day and in dry conditions). Many other examples are possible as well, including but not limited to the possibility that there may be more than two different sampling rates that could be dynamically selected in accordance with this sampling scheme and/or the possibility that dynamically selecting the sampling rate could involve numerically deriving the particular sampling rate based on the contextual information related to the AV's current operation in the geographic area.

As yet another possibility, the on-board computing system may sample the path priors included in the filtered set in accordance with a sampling scheme that involves dynamically selecting which sampling rate to apply to each respective path prior in the filtered set based on contextual information related to the respective path prior and then applying each respective path prior's dynamically-selected sampling rate to the respective path prior. In this respect, the contextual information related to a path prior that may be used as a basis for dynamically selecting a sampling rate for the path prior may take any of various forms, examples of which may include data for contextual variables related to the geometry of the road segment that corresponds to the path prior (e.g., whether the road segment's geometry is curved, straight, etc.), the circumstances under which the path prior was recorded (e.g., time-of-day, date, weather conditions, traffic conditions, and/or school-zone status when the path prior was recorded), and/or a confidence level associated with the path prior, among other possibilities. In line with the discussion above, this data may be referred to as "metadata" for the path priors and may either be incorporated into the map data for the geographic area or maintained separately from the map data. Further, as with the sampling rates described above, a path prior's dynamically-selected sampling rate could be defined in terms of a number of sample points per some unit of distance (e.g., per foot, per mile, etc.) or a number of sample points per road segment, among other possibilities.

To illustrate with an example, while operating in accordance with this type of sampling scheme, the on-board computing system may function to dynamically select a higher sampling rate for a given path prior when the data related to the given path prior indicates that the path prior's corresponding road segment has a more complex geometry (e.g., it is curved) and to dynamically select a lower sampling rate when the data related to the given path prior indicates that the path prior's corresponding road segment has a less complex geometry (e.g., it is straight). Many other examples are possible as well, including but not limited to the possibility that there may be more than two different sampling rates that could be dynamically selected in accordance with this sampling scheme and/or the possibility that dynamically selecting the sampling rate for a path prior could involve numerically deriving the particular sampling rate based on the data related to the path prior.

As still another possibility, the on-board computing system may sample the path priors included in the filtered set in accordance with a sampling scheme that employs a technique for intelligently selecting which points along a path prior to keep and which points along the path prior to discard. Such a technique may take various forms, examples of which may include a technique based on the Ramer-Douglas-Peucker algorithm and/or a technique that evaluates multiple different path priors for a road segment together in order to identify which points to keep and which points to discard (e.g., by keeping points where the different path priors overlap), among other examples.

The type of sampling scheme that is used by the on-board computing system to sample the filtered set of path priors for each road segment in the selected sequence of road segments may take other forms as well, including but not limited to the possibility that the sampling scheme may rely on techniques such as parametric point decomposition and/or discretization techniques other than those described above (e.g., discretization that is proportional to a curve or based on a geometric series). Further, it should be understood that the on-board computing system could also be configured to sample the filtered set of path priors using a combination of two or more of the sampling schemes described above (e.g., the on-board computing system may dynamically select a sampling rate for a path prior that is based on both data related to the path prior itself and also data related to the AV's current operation in the geographic area).

The manner in which the on-board computing system samples the path priors included in the filtered set to decompose those path priors into the set of points that is representative of the filtered set of path priors may take various other forms as well.

In turn, at block 404, the on-board computing system may fit a curve to the set of points produced by the sampling at block 403. In this respect, the technique used to fit a curve to the set of points produced by the sampling at block 404 may take various forms.

As one possibility, the on-board computing system may fit a curve to the set of points produced by the sampling at block 403 using a technique such as polynomial regression to generate a cubic smoothing spline from the set of points, which generally comprises a piecewise polynomial function whose derivatives satisfy some continuity constraints across curve boundaries (e.g., by minimizing both the squared deviation from the set of points and also the curvature of the final piecewise parametric curve). In this respect, depending on whether the set points resulting from the sampling comprise 2D or 3D points, the continuity constraints may be applied in either two dimensions or three dimensions. As another possibly, the on-board computing system may fit a curve to the set of points produced by the sampling at block 404 using a Baysian-based technique. Other techniques may be used to fit a curve to the set of points produced by the sampling at block 403 as well.

At block 405, the on-board computing system may derive the planned path for the AV based on the fitted curve. In this respect, as discussed above, the on-board computing system may derive a planned trajectory for the AV based on the fitted curve, and may then implement the planned trajectory such that the AV physically behaves in a manner that results in the AV traversing a path that is based on the fitted curve resulting from block 404. In this way, the foregoing approach for deriving a planned path of the AV based on path priors may result in the AV engaging in more natural driving behavior that is akin to how a human-driven vehicle would behave, which may improve the experience of a human passenger of the AV.

There are also several possible variations and/or extensions of the example embodiment discussed above with reference to FIGS. 3 and 4. For instance, while the example embodiment discussed above is generally directed to deriving a planned path for the AV in a scenario where there are multiple, relevant path priors available for each road segment, and while generally the quality of the derived planned path is better when there is a larger set of path priors for each road segment, it should be understood that the disclosed technology may also be used in a scenario where there is as little as a single path prior for each road segment. In such a scenario, the runtime phase of the disclosed technology may still involve the same general functions described above, although the sampling will be applied to a single path prior per road segment as opposed to multiple path priors per road segment.

Alternatively, in a scenario where there is only a single path prior available for each road segment in the selected sequence, a different approach for deriving the AV's planned path from these path priors could potentially be used, such as an approach that involves interconnecting the one-per-road-segment path priors together at the intersection points between the road segments and then applying a smoothing technique to the path priors at the intersection points in order to address discrepancies between where one road segment's path prior ends and another road segment's path prior begins. While this approach for deriving an AV's planned path from path priors may also improve upon existing approaches for deriving an AV's planned path that do not rely on actual human driving behavior, it has generally been found to be less effective than the example embodiment described above.

Other variations and/or extensions of the example embodiment discussed above with reference to FIGS. 3 and 4 are possible as well.

One illustrative example of how the runtime phase of the disclosed technology may be used to derive a planned path for an AV using data defining path priors for a geographic area will now be described with reference to FIGS. 5A-5F.

Figure 5A:
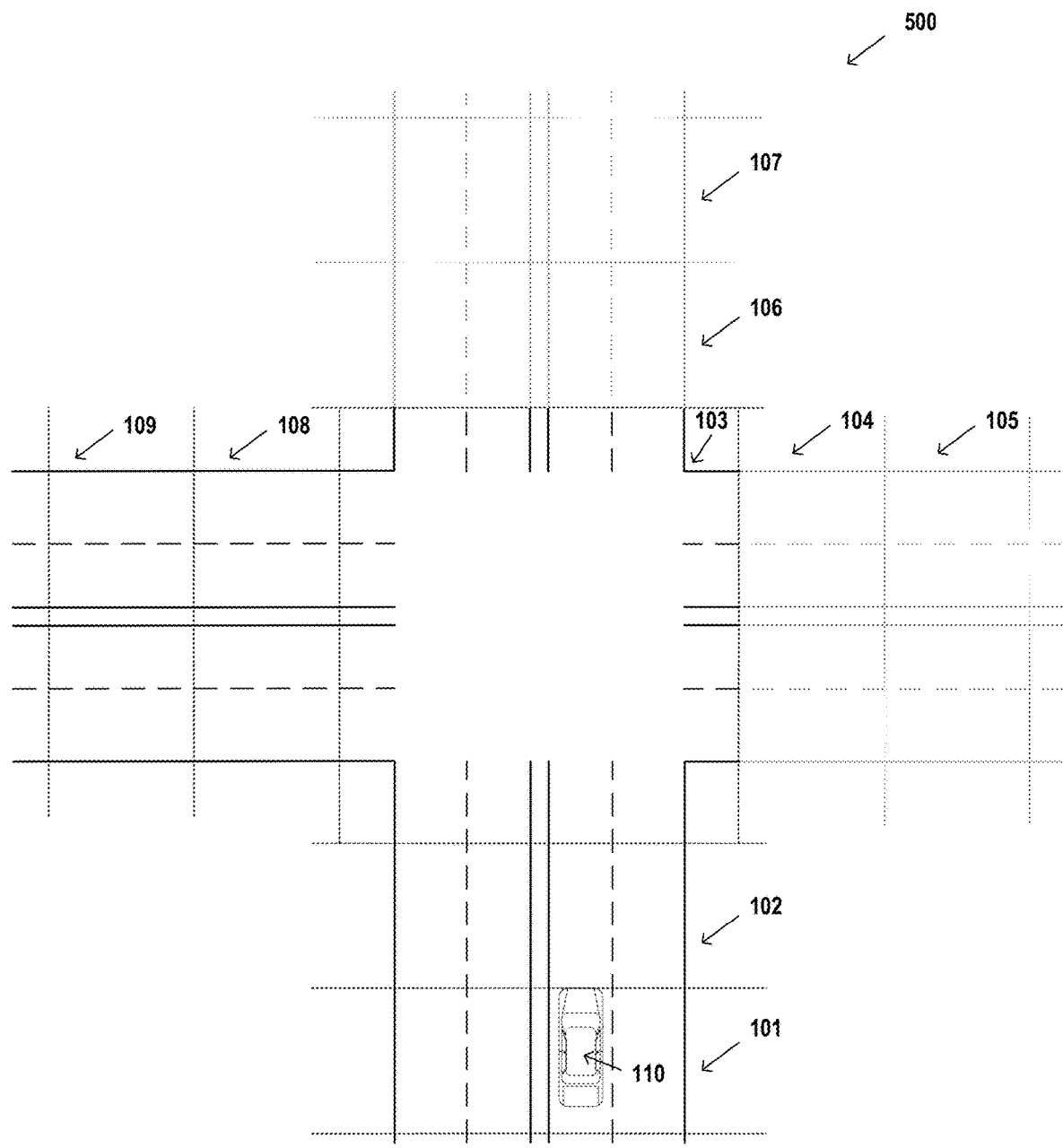
FIGS. 5A-F are diagrams that illustrate a top-down view of the geographic area of FIG. 1 at a time when a vehicle operating in the geographic area functions to derive a planned path in accordance with the present disclosure and then implement a planned trajectory that is based on this planned path.

In line with the discussion above, the AV's on-board computer system may begin by selecting a sequence of road segments to be traversed by a planned path for the AV. One possible example of this function is illustrated in FIG. 5A. As shown in FIG. 5A, there is a geographic area 500 that includes a plurality of road segments 101, 102, 103, 104, 105, 106, 107, 108, and 109, along with an AV 110 operating within the geographic area 500. In this example, the on-board computing system of AV 110 may be tasked with deriving a planned path for AV 110, where the planned path includes a left turn through an intersection. In this respect, the on-board computing system of AV 110 may select road segments 101, 102, 103, 108, and 109 as the sequence of road segments to be traversed by a planned path for AV 110. The selection of road segments 101, 102, 103, 108, and 109 is illustrated by the graying-out of road segments 104, 105, 106, and 107 in FIG. 5A. As previously discussed, the selection of road segments 101, 102, 103, 108, and 109 may be based on data related to the operation of AV 110 in the geographic area 500.

Figure 5B:
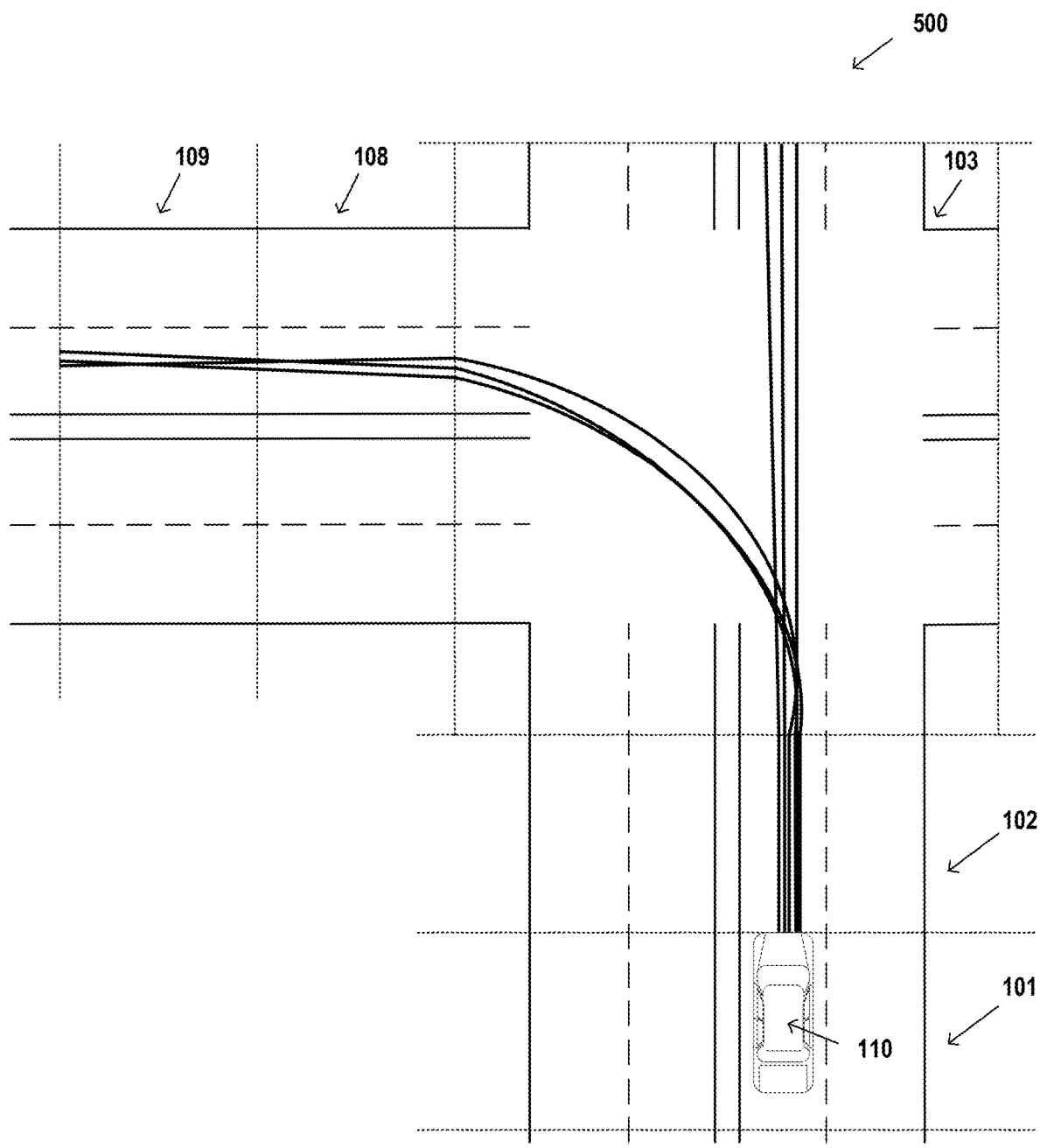

Next, the AV's on-board computer system may identify a respective subset of path priors associated with each road segment in the selected sequence of road segments. One possible example of this function is illustrated in FIG. 5B. As shown in FIG. 5B, the geographic area 500 previously shown in FIG. 5A has been adjusted to show only the selected sequence of road segments 101, 102, 103, 108, and 109 from which the on-boarding computing system of AV 110 is to derive the planned path for AV 110. Further, as shown, a respective subset of path priors has been identified for each road segment in the selected sequence of road segments 102, 103, 108, and 109, but not road segment 101 as AV 110 is crossing the border between road segments 101 and 102. In this example, AV 110 may have identified each respective subset of path priors by accessing a respective map element for each road segment in the selected sequence of road segments 102, 103, 108, and 109 and then identifying the path priors that were included in each respective map element, among other possibilities. While the path priors are shown in FIG. 5B in the 2D space, it should also be understood that, as discussed above, the path priors could be represented in the 3D space as well.

Figure 5C:
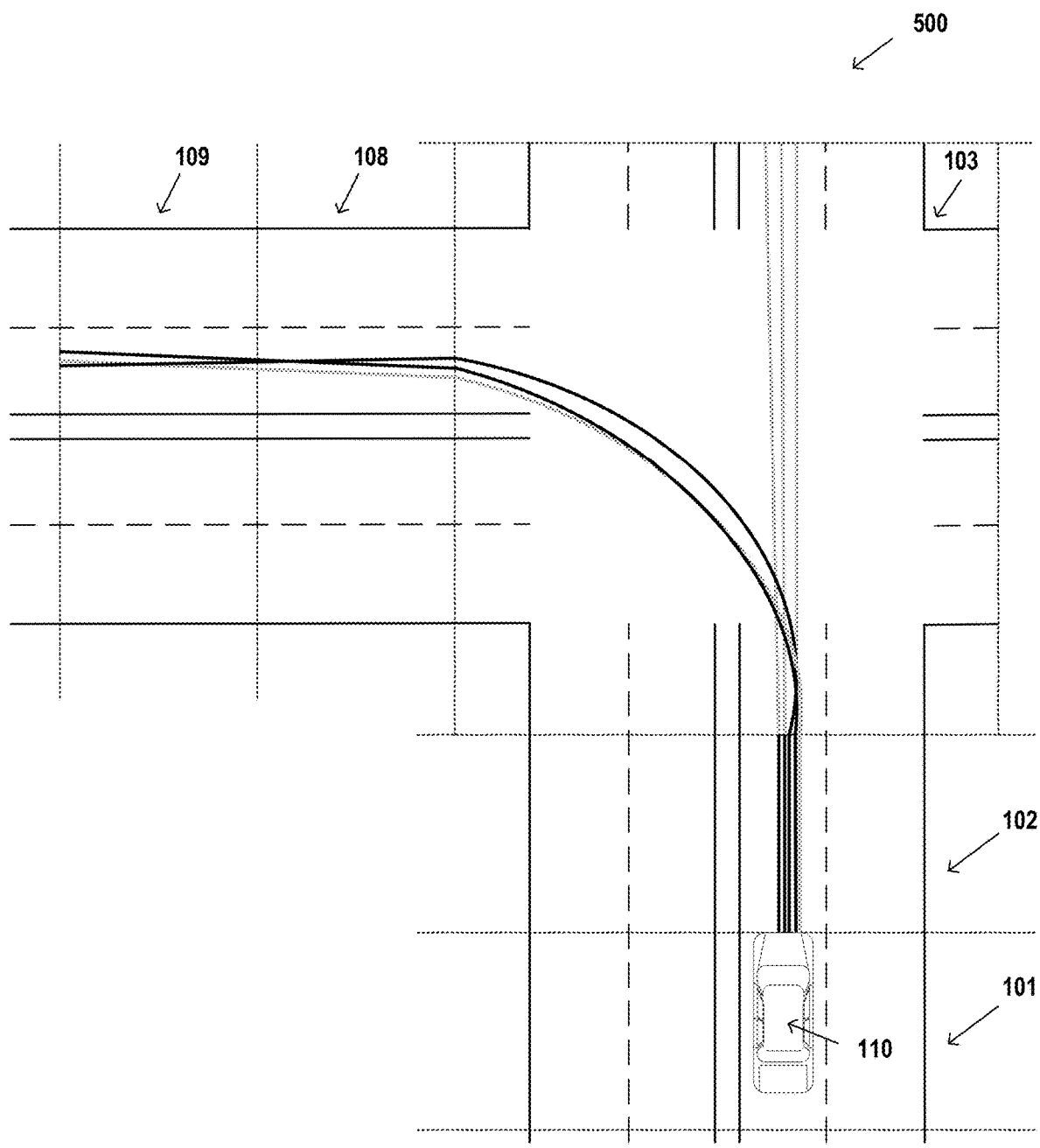

After identifying the respective subset of path priors associated with each road segment in the selected sequence of road segments, the AV's on-board computer system may then filter the respective subset of path priors for each road segment in the selected sequence of road segments. One possible example of this function is illustrated in FIG. 5C. As shown in FIG. 5C, the respective subsets of path priors for road segments 102, 103, 108, and 109 have been filtered based on contextual information related to the current operation of AV 110 in the geographic area 500. For example, AV 110 may be currently operating in the rain, in which case the AV's on-board computing system may filter the respective subset of path priors for each road segment in the selected road segments 102, 103, 108, and 109 to remove any path priors from the respective subsets of path priors that are not associated with operating in the rain. As shown in FIG. 5C, the AV's on-board computing system has filtered, which is shown by a graying-out of the filtered path priors, one path prior from road segments 102, 103, 108, and 109 because it is not associated with operating in the rain.

Further, as previously discussed, the geometry of the selected sequence of road segments may indicate that AV 110 is about to make a left turn. In this respect, the AV's on-board computing system may filter the respective subset of path priors for each road segment in the selected road segments 102, 103, 108, and 109 to remove any path priors from the respective subsets of path priors that are not associated with a left turn. For instance, as shown in FIG. 5C, the AV's on-board computing system has filtered the path priors that are associated with traveling straight (e.g., and not turning left) through road segment 103. It should be understood that while the AV's on-board computing system has filtered the path priors that are associated with traveling straight through road segment 103, the other path priors in road segment 102 that were previously part of the same path prior remain unfiltered since the path priors in road segment 102 are independent and can be used to assist the AV's on-board computing system in deriving a planned path that includes a left turn.

Figure 5D:
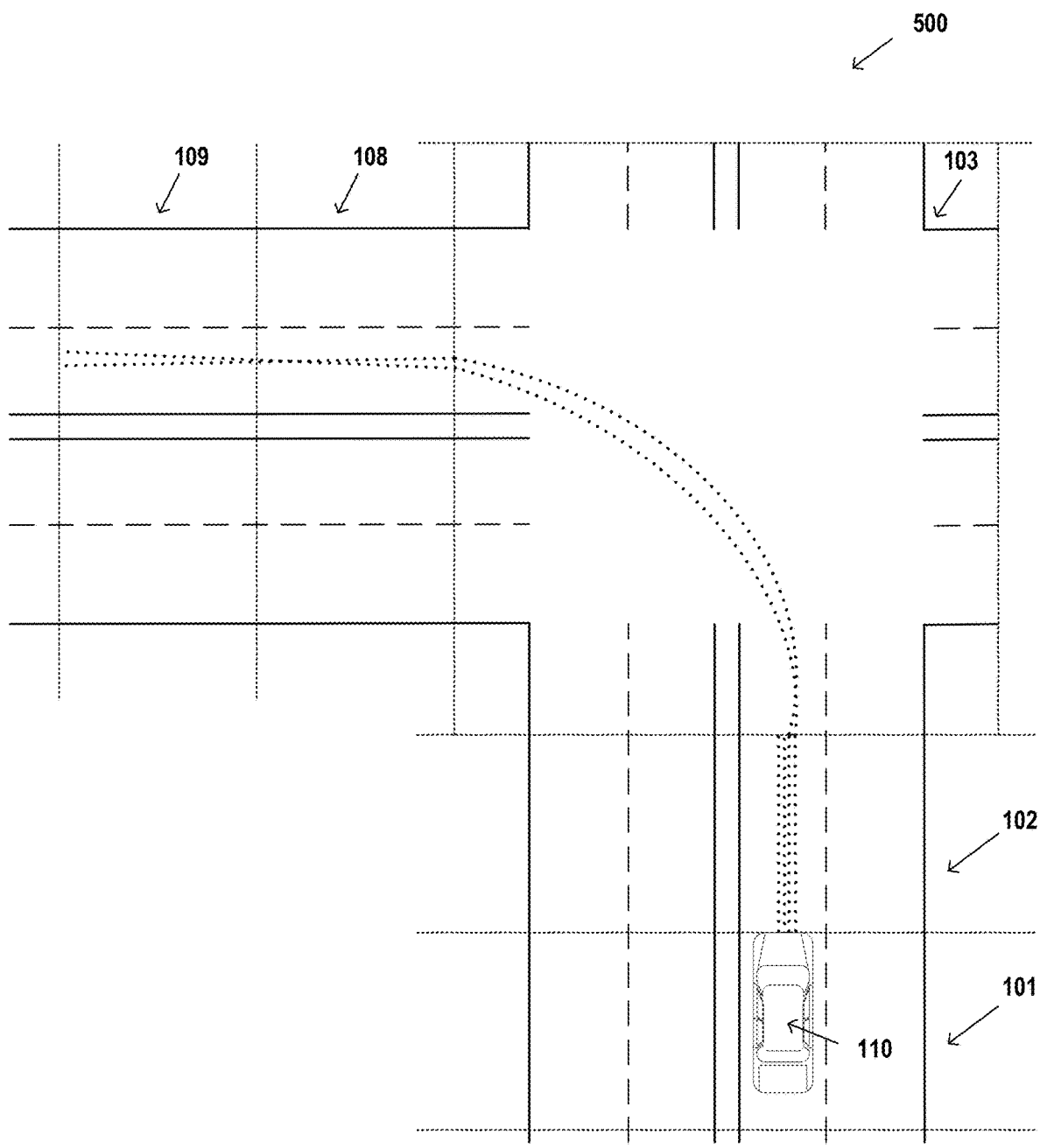

After filtering the respective subset of path priors for each road segment in the selected sequence of road segments, the AV's on-board computing system may next sample the filtered subset of path priors for each road segment in the selected sequence of road segments. One possible example of this function is illustrated in FIG. 5D. As shown in FIG. 5D, the filtered subsets of path priors for road segments 102, 103, 108, and 109 have been sampled to produce a set of points that is representative of the filtered subsets of path priors using a sampling scheme based on data related to the current operation of AV 110 in the geographic area 500. For instance, as previously mentioned, AV 110 may be operating in the rain, in which case the AV's on-board computing system may sample the filtered subsets of path priors for road segments 102, 103, 108, and 109 using a scheme that utilizes a high sampling rate to account for the rainy operating conditions of AV 110.

Figure 5E:
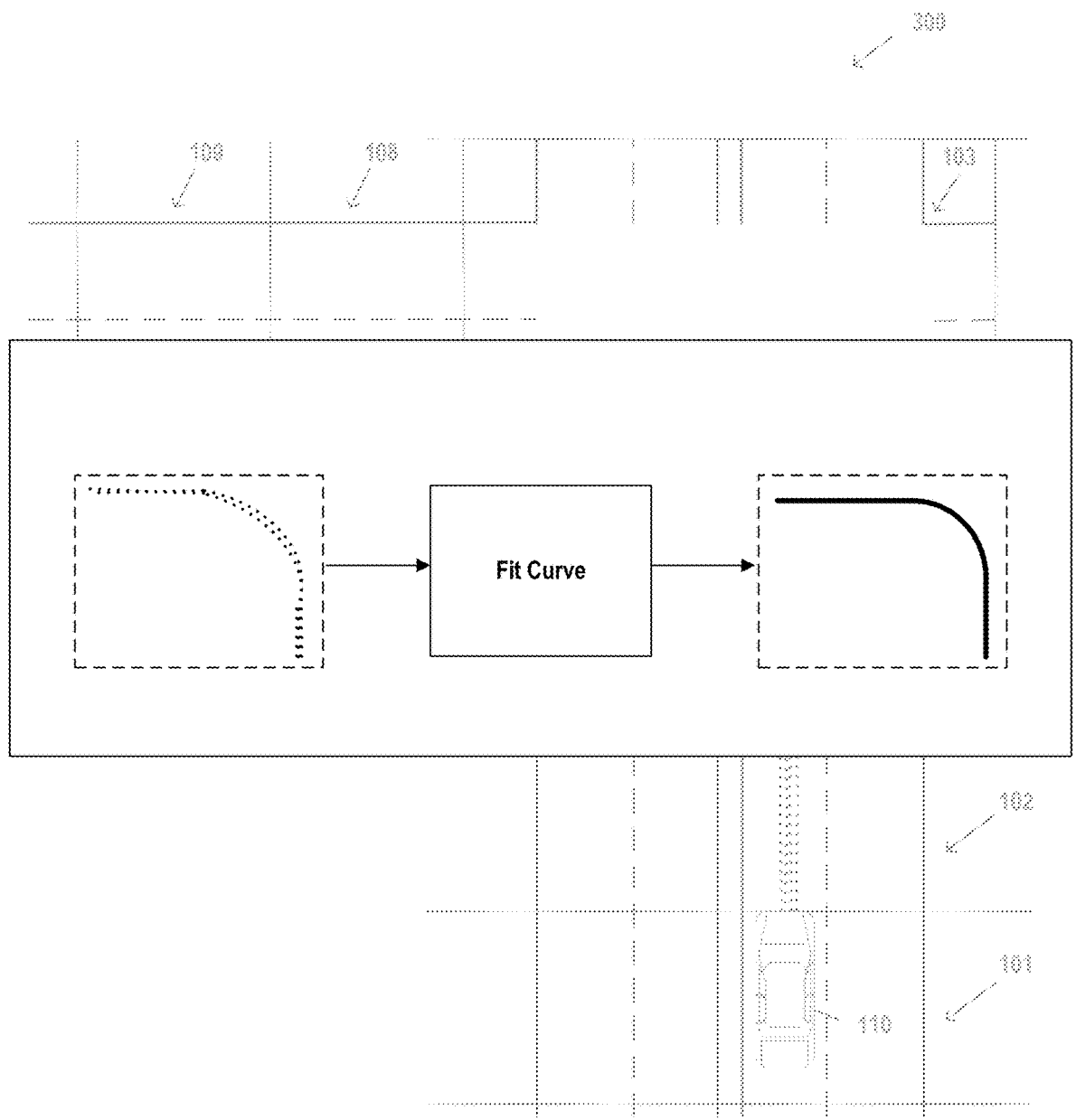

After sampling the filtered subset of path priors for each road segment in the selected sequence of road segments, the AV's on-board computing system may fit a curve to the set of points produced by the sampling. One possible example of this function is illustrated in FIG. 5E. As shown in FIG.

5E, a curve has been fit to the set of points produced by the sampling illustrated in FIG. 5D.

Figure 5F:
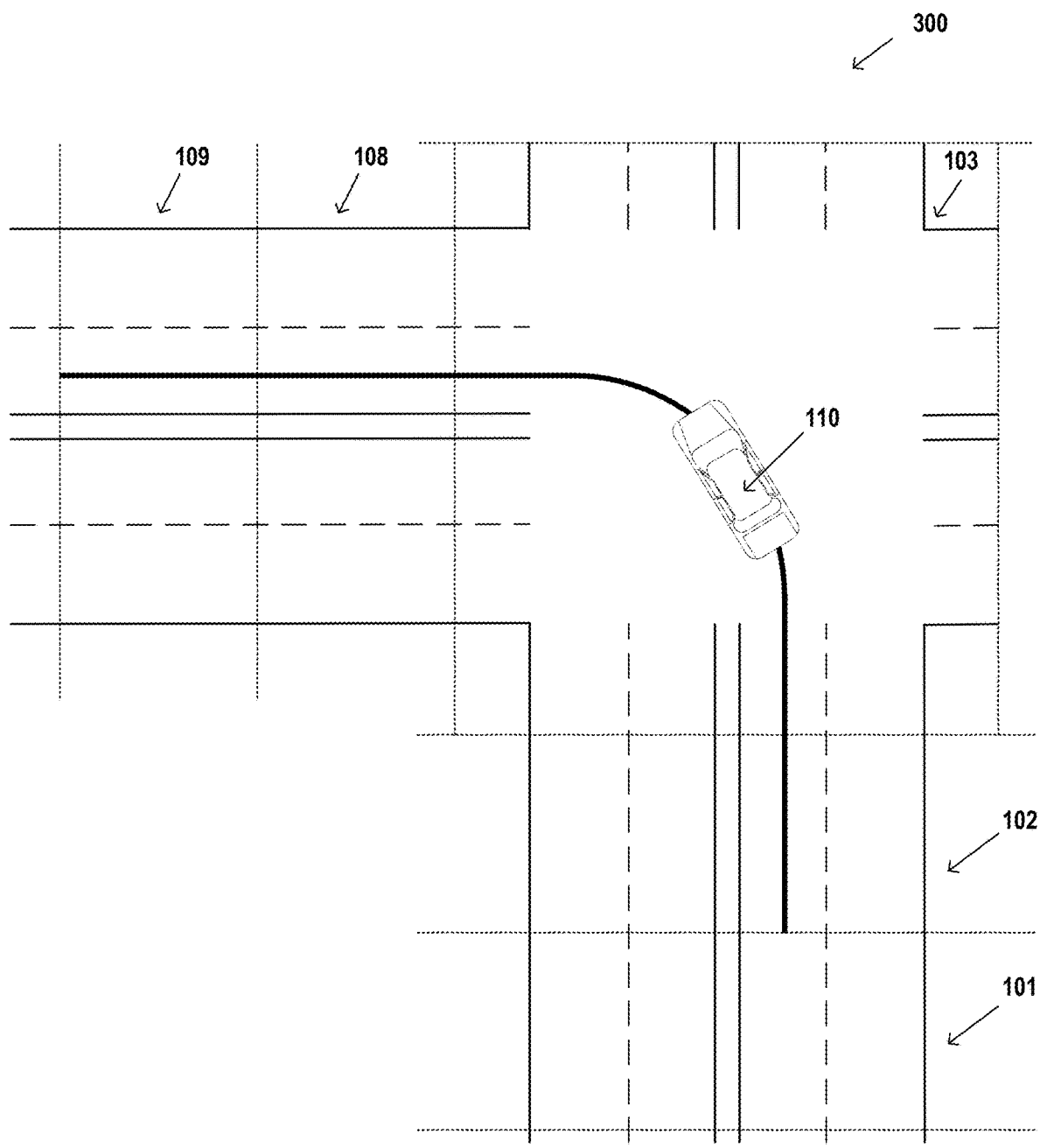

Lastly, after fitting a curve to the set of points produced by the sampling, the AV's on-board computing system may derive the planned path for the AV based on the fitted curve. One possible example of this function is illustrated in FIG. 5F. As shown in FIG. 5F, the AV's on-board computing system has derived a planned path for AV 110 using the fitted curve and has begun implementing the planned path, which is illustrated as AV 110 making a gradual turn through road segment 103. Further, as shown, the driving behavior of AV 110 using the planned path derived using the techniques disclosed above is more naturalistic than the driving behavior of the AV 110 using the path 111 described with respect to FIG. 2B.

Figure 6:
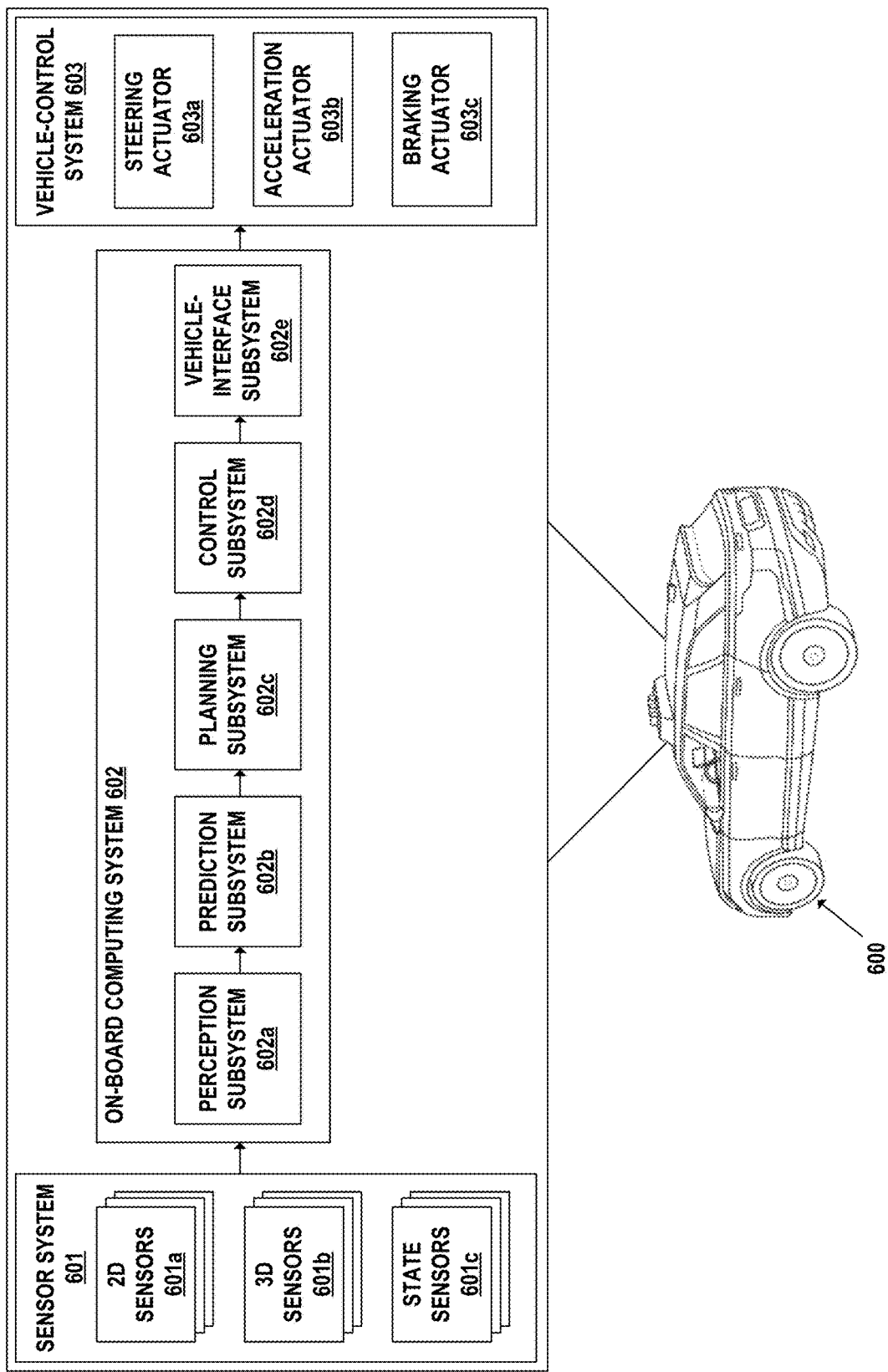
FIG. 6 is a simplified block diagram that illustrates example systems of an example vehicle equipped with autonomous technology.

Turning now to FIG. 6, a simplified block diagram is provided to illustrate certain systems that may be included in an example AV 600. As shown, at a high level, AV 600 may include at least (i) a sensor system 601 that is configured to capture sensor data that is representative of the real-world environment being perceived by the AV (i.e., the AV's "surrounding environment") and/or the AV's operation within that real-world environment, (ii) an on-board computing system 602 that is configured to perform functions related to autonomous operation of AV 600 (and perhaps other functions as well), and (iii) a vehicle-control system 603 that is configured to control the physical operation of AV 600, among other possibilities. Each of these AV systems may take various forms.

In general, sensor system 601 may comprise any of various different types of sensors, each of which is generally configured to detect one or more particular stimuli based on AV 600 operating in a real-world environment and then output sensor data that is indicative of one or more measured values of the one or more stimuli at one or more capture times (which may each comprise a single instant of time or a range of times).

For instance, as one possibility, sensor system 601 may include one or more 2D sensors 601a that are each configured to capture 2D data that is representative of the AV's surrounding environment. Examples of 2D sensor(s) 601a may include a 2D camera array, a 2D Radio Detection and Ranging (RADAR) unit, a 2D Sound Navigation and Ranging (SONAR) unit, a 2D ultrasound unit, a 2D scanner, and/or 2D sensors equipped with visible-light and/or infra-red sensing capabilities, among other possibilities. Further, in an example implementation, 2D sensor(s) 601a comprises an arrangement that is capable of capturing 2D sensor data representing a 360° view of the AV's surrounding environment, one example of which may take the form of an array of 6-7 cameras that each have a different capture angle. Other 2D sensor arrangements are also possible.

As another possibility, sensor system 601 may include one or more 3D sensors 601b that are each configured to capture 3D data that is representative of the AV's surrounding environment. Examples of 3D sensor(s) 601b may include a Light Detection and Ranging (LIDAR) unit, a 3D RADAR unit, a 3D SONAR unit, a 3D ultrasound unit, and a camera array equipped for stereo vision, among other possibilities. Further, in an example implementation, 3D sensor(s) 601b may comprise an arrangement that is capable of capturing 3D sensor data representing a 360° view of the AV's surrounding environment, one example of which may take the form of a LIDAR unit that is configured to rotate 360° around its installation axis. Other 3D sensor arrangements are also possible.

As yet another possibility, sensor system 601 may include one or more state sensors 601c that are each configured to detect aspects of the AV's current state, such as the AV's current position, current orientation (e.g., heading/yaw, pitch, and/or roll), current velocity, and/or current acceleration of AV 600. Examples of state sensor(s) 601c may include an Inertial Measurement Unit (IMU) (which may be comprised of accelerometers, gyroscopes, and/or magnetometers), an Inertial Navigation System (INS), a Global Navigation Satellite System (GNSS) unit such as a Global Positioning System (GPS) unit, among other possibilities.

Sensor system 601 may include various other types of sensors as well.

In turn, on-board computing system 602 may generally comprise any computing system that includes at least a communication interface, a processor, and data storage, where such components may either be part of a single physical computing device or be distributed across a plurality of physical computing devices that are interconnected together via a communication link. Each of these components may take various forms.

For instance, the communication interface of on-board computing system 602 may take the form of any one or more interfaces that facilitate communication with other systems of AV 600 (e.g., sensor system 601 and vehicle-control system 603) and/or remote computing systems (e.g., a ride-services management system), among other possibilities. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols.

Further, the processor of on-board computing system 602 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities.

Further yet, the data storage of on-board computing system 602 may comprise one or more non-transitory computer-readable mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.), and these one or more non-transitory computer-readable mediums may be capable of storing both (i) program instructions that are executable by the processor of on-board computing system 602 such that on-board computing system 602 is configured to perform various functions related to the autonomous operation of AV 600 (among other possible functions), and (ii) data that may be obtained, derived, or otherwise stored by on-board computing system 602.

In one embodiment, on-board computing system 602 may also be functionally configured into a number of different subsystems that are each tasked with performing a specific subset of functions that facilitate the autonomous operation of AV 600, and these subsystems may be collectively referred to as the AV's "autonomy system." In practice, each of these subsystems may be implemented in the form of program instructions that are stored in the on-board computing system's data storage and are executable by the on-board computing system's processor to carry out the subsystem's specific subset of functions, although other implementations are possible as well—including the possibility that different subsystems could be implemented via different hardware components of on-board computing system 602.

As shown in FIG. 6, in one embodiment, the functional subsystems of on-board computing system 602 may include (i) a perception subsystem 602a that generally functions to derive a representation of the surrounding environment being perceived by AV 600, (ii) a prediction subsystem 602b that generally functions to predict the future state of each object detected in the AV's surrounding environment, (iii) a planning subsystem 602c that generally functions to derive a behavior plan for AV 600, (iv) a control subsystem 602d that generally functions to transform the behavior plan for AV 600 into control signals for causing AV 600 to execute the behavior plan, and (v) a vehicle-interface subsystem 602e that generally functions to translate the control signals into a format that vehicle-control system 603 can interpret and execute. However, it should be understood that the functional subsystems of on-board computing system 602 may take various forms as well. Each of these example subsystems will now be described in further detail below.

For instance, the subsystems of on-board computing system 602 may begin with perception subsystem 602a, which may be configured to fuse together various different types of "raw" data that relates to the AV's perception of its surrounding environment and thereby derive a representation of the surrounding environment being perceived by AV 600. In this respect, the "raw" data that is used by perception subsystem 602a to derive the representation of the AV's surrounding environment may take any of various forms.

For instance, at a minimum, the "raw" data that is used by perception subsystem 602a may include multiple different types of sensor data captured by sensor system 601, such as 2D sensor data (e.g., image data) that provides a 2D representation of the AV's surrounding environment, 3D sensor data (e.g., LIDAR data) that provides a 3D representation of the AV's surrounding environment, and/or state data for AV 600 that indicates the past and current position, orientation, velocity, and acceleration of AV 600. Additionally, the "raw" data that is used by perception subsystem 602a may include map data associated with the AV's location, such as high-definition geometric and/or semantic map data, which may be preloaded onto on-board computing system 602 and/or obtained from a remote computing system. Additionally yet, the "raw" data that is used by perception subsystem 602a may include navigation data for AV 600 that indicates a specified origin and/or specified destination for AV 600, which may be obtained from a remote computing system (e.g., a ride-services management system) and/or input by a human riding in AV 600 via a user-interface component that is communicatively coupled to on-board computing system 602. Additionally still, the "raw" data that is used by perception subsystem 602a may include other types of data that may provide context for the AV's perception of its surrounding environment, such as weather data and/or traffic data, which may be obtained from a remote computing system. The "raw" data that is used by perception subsystem 602a may include other types of data as well.

Advantageously, by fusing together multiple different types of raw data (e.g., both 2D sensor data and 3D sensor data), perception subsystem 602a is able to leverage the relative strengths of these different types of raw data in a way that may produce a more accurate and precise representation of the surrounding environment being perceived by AV 600.

Further, the function of deriving the representation of the surrounding environment perceived by AV 600 using the raw data may include various aspects. For instance, one aspect of deriving the representation of the surrounding environment perceived by AV 600 using the raw data may involve determining a current state of AV 600 itself, such as a current position, a current orientation, a current velocity, and/or a current acceleration, among other possibilities. In this respect, perception subsystem 602a may also employ a localization technique such as SLAM to assist in the determination of the AV's current position and/or orientation. (Alternatively, it is possible that on-board computing system 602 may run a separate localization service that determines position and/or orientation values for AV 600 based on raw data, in which case these position and/or orientation values may serve as another input to perception subsystem 602a).

Another aspect of deriving the representation of the surrounding environment perceived by AV 600 using the raw data may involve detecting objects within the AV's surrounding environment, which may result in the determination of class labels, bounding boxes, or the like for each detected object. In this respect, the particular classes of objects that are detected by perception subsystem 602a (which may be referred to as "agents") may take various forms, including both (i) "dynamic" objects that have the potential to move, such as vehicles, cyclists, pedestrians, and animals, among other examples, and (ii) "static" objects that generally do not have the potential to move, such as streets, curbs, lane markings, traffic lights, stop signs, and buildings, among other examples. Further, in practice, perception subsystem 602a may be configured to detect objects within the AV's surrounding environment using any type of object detection model now known or later developed, including but not limited object detection models based on convolutional neural networks (CNN).

Yet another aspect of deriving the representation of the surrounding environment perceived by AV 600 using the raw data may involve determining a current state of each object detected in the AV's surrounding environment, such as a current position (which could be reflected in terms of coordinates and/or in terms of a distance and direction from AV 600), a current orientation, a current velocity, and/or a current acceleration of each detected object, among other possibilities. In this respect, the current state each detected object may be determined either in terms of an absolute measurement system or in terms of a relative measurement system that is defined relative to a state of AV 600, among other possibilities.

The function of deriving the representation of the surrounding environment perceived by AV 600 using the raw data may include other aspects as well.

Further yet, the derived representation of the surrounding environment perceived by AV 600 may incorporate various different information about the surrounding environment perceived by AV 600, examples of which may include (i) a respective set of information for each object detected in the AV's surrounding, such as a class label, a bounding box, and/or state information for each detected object, (ii) a set of information for AV 600 itself, such as state information and/or navigation information (e.g., a specified destination), and/or (iii) other semantic information about the surrounding environment (e.g., time of day, weather conditions, traffic conditions, etc.). The derived representation of the surrounding environment perceived by AV 600 may incorporate other types of information about the surrounding environment perceived by AV 600 as well.

Still further, the derived representation of the surrounding environment perceived by AV 600 may be embodied in various forms. For instance, as one possibility, the derived representation of the surrounding environment perceived by AV 600 may be embodied in the form of a data structure that represents the surrounding environment perceived by AV 600, which may comprise respective data arrays (e.g., vectors) that contain information about the objects detected in the surrounding environment perceived by AV 600, a data array that contains information about AV 600, and/or one or more data arrays that contain other semantic information about the surrounding environment. Such a data structure may be referred to as a "parameter-based encoding."

As another possibility, the derived representation of the surrounding environment perceived by AV 600 may be embodied in the form of a rasterized image that represents the surrounding environment perceived by AV 600 in the form of colored pixels. In this respect, the rasterized image may represent the surrounding environment perceived by AV 600 from various different visual perspectives, examples of which may include a "top down" view and a "birds eye" view of the surrounding environment, among other possibilities. Further, in the rasterized image, the objects detected in the surrounding environment of AV 600 (and perhaps AV 600 itself) could be shown as color-coded bitmasks and/or bounding boxes, among other possibilities.

The derived representation of the surrounding environment perceived by AV 600 may be embodied in other forms as well.

As shown, perception subsystem 602*a* may pass its derived representation of the AV's surrounding environment to prediction subsystem 602*b*. In turn, prediction subsystem 602*b* may be configured to use the derived representation of the AV's surrounding environment (and perhaps other data) to predict a future state of each object detected in the AV's surrounding environment at one or more future times (e.g., at each second over the next 5 seconds)—which may enable AV 600 to anticipate how the real-world objects in its surrounding environment are likely to behave in the future and then plan its behavior in a way that accounts for this future behavior.

Prediction subsystem 602*b* may be configured to predict various aspects of a detected object's future state, examples of which may include a predicted future position of the detected object, a predicted future orientation of the detected object, a predicted future velocity of the detected object, and/or predicted future acceleration of the detected object, among other possibilities. In this respect, if prediction subsystem 602*b* is configured to predict this type of future state information for a detected object at multiple future times, such a time sequence of future states may collectively define a predicted future trajectory of the detected object. Further, in some embodiments, prediction subsystem 602*b* could be configured to predict multiple different possibilities of future states for a detected (e.g., by predicting the 3 most-likely future trajectories of the detected object). Prediction subsystem 602*b* may be configured to predict other aspects of a detected object's future behavior as well.

In practice, prediction subsystem 602*b* may predict a future state of an object detected in the AV's surrounding environment in various manners, which may depend in part on the type of detected object. For instance, as one possibility, prediction subsystem 602*b* may predict the future state of a detected object using a data science model that is configured to (i) receive input data that includes one or more derived representations output by perception subsystem 602*a* at one or more perception times (e.g., the "current" perception time and perhaps also one or more prior perception times), (ii) based on an evaluation of the input data, which includes state information for the objects detected in the AV's surrounding environment at the one or more perception times, predict at least one likely time sequence of future states of the detected object (e.g., at least one likely future trajectory of the detected object), and (iii) output an indicator of the at least one likely time sequence of future states of the detected object. This type of data science model may be referred to herein as a "future-state model."

Such a future-state model will typically be created by an off-board computing system (e.g., a backend ride-services management system) and then loaded onto on-board computing system 602, although it is possible that a future-state model could be created by on-board computing system 602 itself. Either way, the future-state may be created using any modeling technique now known or later developed, including but not limited to a machine-learning technique that may be used to iteratively "train" the data science model to predict a likely time sequence of future states of an object based on training data that comprises both test data (e.g., historical representations of surrounding environments at certain historical perception times) and associated ground-truth data (e.g., historical state data that indicates the actual states of objects in the surrounding environments during some window of time following the historical perception times).

Prediction subsystem 602*b* could predict the future state of a detected object in other manners as well. For instance, for detected objects that have been classified by perception subsystem 602*a* as belonging to certain classes of static objects (e.g., roads, curbs, lane markings, etc.), which generally do not have the potential to move, prediction subsystem 602*b* may rely on this classification as a basis for predicting that the future state of the detected object will remain the same at each of the one or more future times (in which case the state-prediction model may not be used for such detected objects). However, it should be understood that detected objects may be classified by perception subsystem 602*a* as belonging to other classes of static objects that have the potential to change state despite not having the potential to move, in which case prediction subsystem 602*b* may still use a future-state model to predict the future state of such detected objects. One example of a static object class that falls within this category is a traffic light, which generally does not have the potential to move but may nevertheless have the potential to change states (e.g. between green, yellow, and red) while being perceived by AV 600.

After predicting the future state of each object detected in the surrounding environment perceived by AV 600 at one or more future times, prediction subsystem 602*b* may then either incorporate this predicted state information into the previously-derived representation of the AV's surrounding environment (e.g., by adding data arrays to the data structure that represents the surrounding environment) or derive a separate representation of the AV's surrounding environment that incorporates the predicted state information for the detected objects, among other possibilities.

As shown, prediction subsystem 602*b* may pass the one or more derived representations of the AV's surrounding environment to planning subsystem 602*c*. In turn, planning subsystem 602*c* may be configured to use the one or more derived representations of the AV's surrounding environment (and perhaps other data) to derive a behavior plan for AV 600, which defines the desired driving behavior of AV 600 for some future period of time (e.g., the next 5 seconds).

The behavior plan that is derived for AV 600 may take various forms. For instance, as one possibility, the derived behavior plan for AV 600 may comprise a planned trajectory for AV 600 that specifies a planned state of AV 600 at each of one or more future times (e.g., each second over the next 5 seconds), where the planned state for each future time may include a planned position of AV 600 at the future time, a planned orientation of AV 600 at the future time, a planned velocity of AV 600 at the future time, and/or a planned acceleration of AV 600 (whether positive or negative) at the future time, among other possible types of state information. As another possibility, the derived behavior plan for AV 600 may comprise one or more planned actions that are to be performed by AV 600 during the future window of time, where each planned action is defined in terms of the type of action to be performed by AV 600 and a time and/or location at which AV 600 is to perform the action, among other possibilities. The derived behavior plan for AV 600 may define other planned aspects of the AV's behavior as well.

Further, in practice, planning subsystem 602*c* may derive the behavior plan for AV 600 in various manners. For instance, as one possibility, planning subsystem 602*c* may be configured to derive the behavior plan for AV 600 by (i) deriving a plurality of different "candidate" behavior plans for AV 600 based on the one or more derived representations of the AV's surrounding environment (and perhaps other data), (ii) evaluating the candidate behavior plans relative to one another (e.g., by scoring the candidate behavior plans using one or more cost functions) in order to identify which candidate behavior plan is most desirable when considering factors such as proximity to other objects, velocity, acceleration, time and/or distance to destination, road conditions, weather conditions, traffic conditions, and/or traffic laws, among other possibilities, and then (iii) selecting the candidate behavior plan identified as being most desirable as the behavior plan to use for AV 600. Planning subsystem 602*c* may derive the behavior plan for AV 600 in various other manners as well.

After deriving the behavior plan for AV 600, planning subsystem 602*c* may pass data indicating the derived behavior plan to control subsystem 602*d*. In turn, control subsystem 602*d* may be configured to transform the behavior plan for AV 600 into one or more control signals (e.g., a set of one or more command messages) for causing AV 600 to execute the behavior plan. For instance, based on the behavior plan for AV 600, control subsystem 602*d* may be configured to generate control signals for causing AV 600 to adjust its steering in a specified manner, accelerate in a specified manner, and/or brake in a specified manner, among other possibilities.

As shown, control subsystem 602*d* may then pass the one or more control signals for causing AV 600 to execute the behavior plan to vehicle-interface subsystem 602*e*. In turn, vehicle-interface subsystem 602*e* may be configured to translate the one or more control signals into a format that can be interpreted and executed by components of vehicle-control system 603. For example, vehicle-interface subsystem 602*e* may be configured to translate the one or more control signals into one or more control messages defined according to a particular format or standard, such as a CAN bus standard and/or some other format or standard that is used by components of vehicle-control system 603.

In turn, vehicle-interface subsystem 602*e* may be configured to direct the one or more control signals to the appropriate control components of vehicle-control system 603. For instance, as shown, vehicle-control system 603 may include a plurality of actuators that are each configured to control a respective aspect of the AV's physical operation, such as a steering actuator 603*a* that is configured to control the vehicle components responsible for steering (not shown), an acceleration actuator 603*b* that is configured to control the vehicle components responsible for acceleration such as throttle (not shown), and a braking actuator 603*c* that is configured to control the vehicle components responsible for braking (not shown), among other possibilities. In such an arrangement, vehicle-interface subsystem 602*e* of on-board computing system 602 may be configured to direct steering-related control signals to steering actuator 603*a*, acceleration-related control signals to acceleration actuator 603*b*, and braking-related control signals to braking actuator 603*c*. However, it should be understood that the control components of vehicle-control system 603 may take various other forms as well.

Notably, the subsystems of on-board computing system 602 may be configured to perform the above functions in a repeated manner, such as many times per second, which may enable AV 600 to continually update both its understanding of the surrounding environment and its planned behavior within that surrounding environment.

Although not specifically shown, it should be understood that AV 600 includes various other systems and components as well, including but not limited to a propulsion system that is responsible for creating the force that leads to the physical movement of AV 600.

Figure 7:
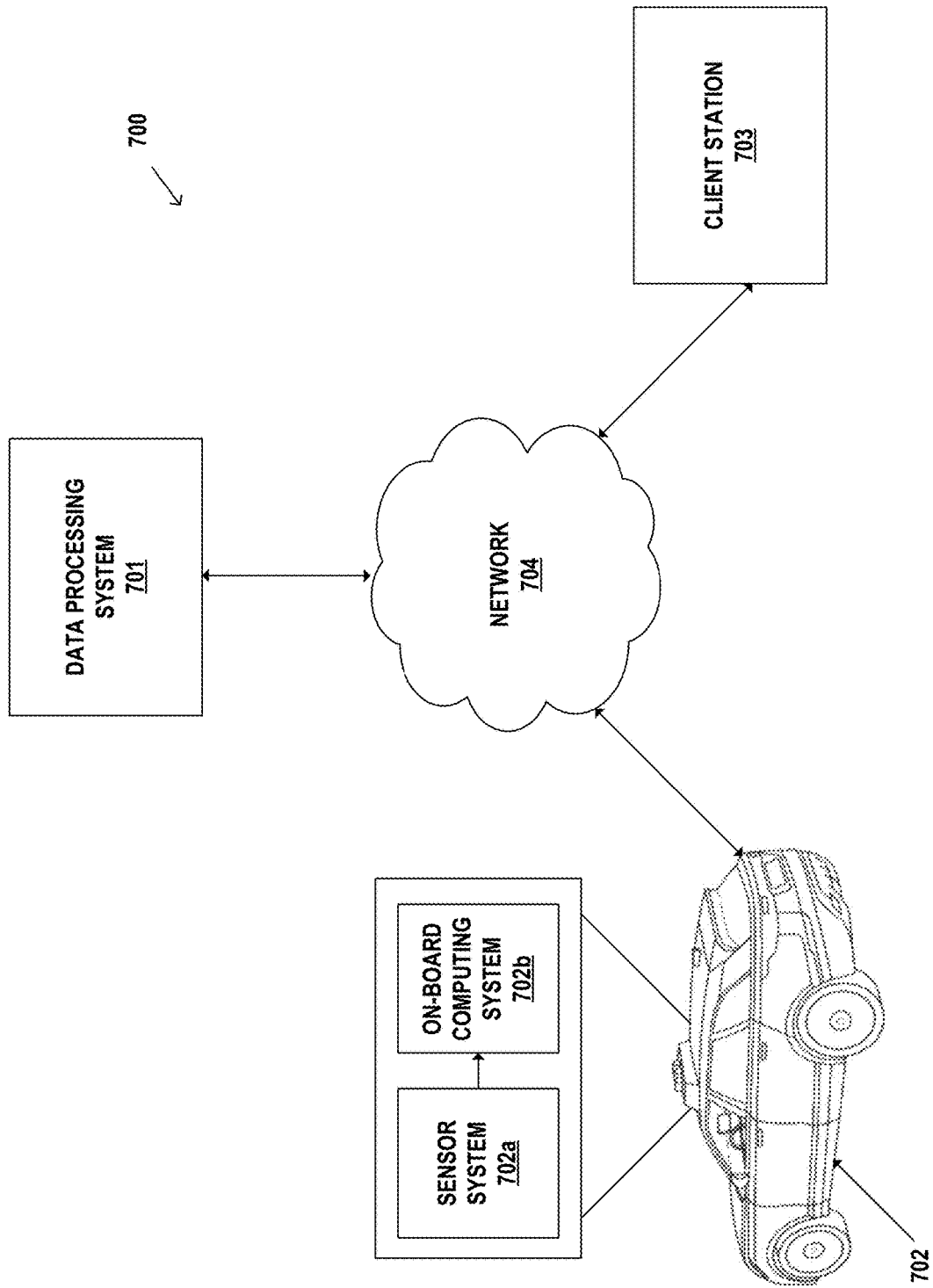
FIG. 7 is a simplified block diagram that illustrates a networked system arrangement in which example embodiments of a learning phase of the present disclosure may be implemented.

Turning now to FIG. 7, a simplified block diagram is provided to illustrate one example of a networked system arrangement 700 in which example embodiments of the learning phase of the present disclosure may be implemented. As shown, system arrangement 700 may include a data processing system 701, which may be communicatively coupled to at least one collection vehicle 702 and at least one client station 703 via one or more communication networks 704.

Broadly speaking, data processing system 701 may include one or more computing systems that collectively comprise a communication interface, a processor, data storage, and executable program instructions for carrying out functions related to the learning phase of the present disclosure, which generally involves obtaining trajectories for a geographic area and then making such data available for use by AVs operating in the geographic area. These one or more computing systems of data processing system 701 may take various forms and be arranged in various manners.

For instance, as one possibility, data processing system 701 may comprise computing infrastructure of a public, private, and/or hybrid cloud (e.g., computing and/or storage clusters) that has been provisioned with software for carrying out one or more of the learning-phase functions disclosed herein. In this respect, the entity that owns and operates data processing system 701 may either supply its own cloud infrastructure or may obtain the cloud infrastructure from a third-party provider of "on demand" computing resources, such as Amazon Web Services (AWS), Microsoft Azure, Google Cloud, Alibaba Cloud, or the like. As another possibility, data processing system 701 may comprise one or more dedicated servers that have been provisioned with software for carrying out one or more of the learning-phase functions disclosed herein. Other implementations of data processing system 701 are possible as well.

As noted above, data processing system 701 may be communicatively coupled to at least one collection vehicle 702, which may generally comprise any vehicle that is capable of collecting data while operating in a real-world environment. In accordance with the present disclosure, collection vehicle 702 may primarily be operated by a human driver, although it is possible that collection vehicle 702 could also be equipped with autonomous technology that enables collection vehicle 702 to operate autonomously. Either way, as shown, collection vehicle 702 may include at least a sensor system 702a that is configured to capture sensor data related to the collection vehicle's operation within a real-world environment and an on-board computing system 702b that is generally configured to perform functions related to processing and distributing data related to the collection vehicle's operation within the real-world environment (among other possible functions). Each of these collection-vehicle systems may take various forms.

For instance, sensor system 702a may generally comprise an arrangement of one or more different types of sensors that are affixed to collection vehicle 702 and configured to capture sensor data related to the collection vehicle's operation within a real-world environment. In this respect, the types of sensors included in sensor system 702a may be similar to the types of sensors included in sensor system 601 of example AV 600. For example, in line with the discussion above, sensor system 702a may include (i) one or more 2D sensors (e.g., a 2D camera array, 2D RADAR unit, 2D SONAR unit, 2D ultrasound unit, a 2D scanner, and/or 2D sensor equipped with visible-light and/or infrared sensing capabilities), (ii) one or more 3D sensors (e.g., LIDAR unit, 3D RADAR unit, 3D SONAR unit, 3D ultrasound unit, and/or a camera array equipped for stereo vision), and/or (iii) one or more state sensors (e.g., an IMU, an INS, and/or a GNSS unit). Sensor system 702a may include other types of sensors and/or take other forms as well—including the possibility that the collection vehicle's sensor system 702a could include a different arrangement of sensors than the example AV's sensor system 601.

In turn, on-board computing system 702b of collection vehicle 702 may generally comprise any computing system that includes at least a communication interface, a processor, and data storage, where such components may either be part of a single physical computing device or be distributed across a plurality of physical computing devices that are interconnected together via a communication link. Each of these components may be similar in form to that of the components of on-board computing system 602 of example AV 600 described above.

For instance, the communication interface of on-board computing system 702b may take the form of any one or more interfaces that facilitate communication with other systems of collection vehicle 702 (e.g., sensor system 702a), data processing system 701, as well as other remote computing systems, among other possibilities. In this respect, each such interface may be wired and/or wireless and may communicate according to any of various communication protocols, including but not limited to the communication protocols described above. Further, the processor of on-board computing system 702b may comprise one or more processor components, each of which may take any of the forms described above. Further yet, the data storage of on-board computing system 702b may comprise one or more non-transitory computer-readable mediums, each of which may take any of the forms described above and these one or more non-transitory computer-readable mediums may be capable of storing both (i) program instructions that are executable by the processor of on-board computing system 702b such that on-board computing system 702b is configured to perform various functions related to processing and distributing data related to the collection vehicle's operation within the real-world environment (among other possible functions), and (ii) data that may be received, derived, or otherwise stored by on-board computing system 702b.

For instance, in accordance with the present disclosure, the data storage of on-board computing system 702b may be provisioned with program instructions that that are executable by the processor of on-board computing system 702b such that on-board computing system 702b is configured to (i) receive sensor data that was captured by collection vehicle's sensor system 702a while collection vehicle 702 was being operated by a human driver in a real-world environment, (ii) perform various processing on the received sensor data, including transforming and/or arranging the received sensor data into a form suitable for transmission to other computing systems and perhaps also generating other derived data based on the received sensor data, and (iii) cause the processed sensor data (which may include derived data) to be transmitted to data processing system 701 via the communication interface of on-board computing system 702b. However, the program instructions stored in the data storage of on-board computing system 702b may take various other forms as well.

Data processing system 701 also may be communicatively coupled to at least one client station 703, which may generally comprise any computing device that is configured to facilitate user interaction with data processing system 701. For instance, client station 703 may take the form of a desktop computer, a laptop, a netbook, a tablet, a smartphone, and/or a personal digital assistant (PDA), among other possibilities, where each such device may comprise an input/output (I/O) interface, a communication interface, a processor, data storage, and executable program instructions for facilitating user interaction with data processing system 701. In this respect, the user interaction that may take place with data processing system 701 in accordance with the present disclosure may take various forms, examples of which may include inputting and/or reviewing trajectories.

As discussed above, data processing system 701 may be communicatively coupled to collection vehicle 702 and client station 703 via communication network 704, which may take various forms. For instance, at a high level, communication network 704 may include one or more Wide-Area Networks (WANs) (e.g., the Internet or a cellular network), Local-Area Networks (LANs), and/or Personal Area Networks (PANs), where each such network which may be wired and/or wireless and may carry data according to any of various different communication protocols. Further, it should be understood that the respective communications paths between the system entities of FIG. 7 may take other forms as well, including the possibility that such communication paths include communication links and/or intermediate devices that are not shown.

It should be understood that system arrangement 700 may take include various other entities and various other forms as well.

Figure 8:
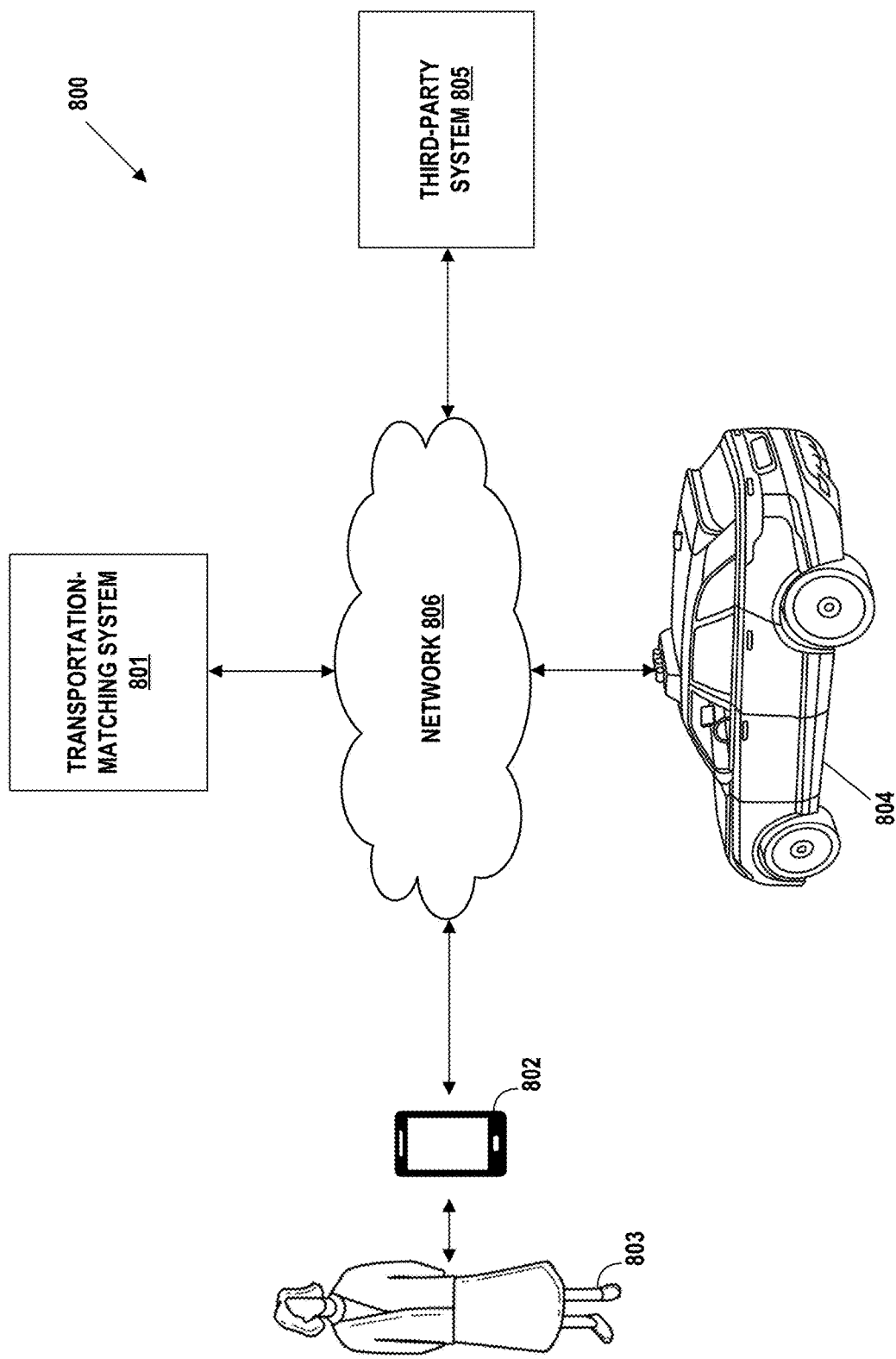
FIG. 8 is a simplified block diagram that illustrates one example of a transportation-matching platform.

Turning now to FIG. 8, a simplified block diagram is provided to illustrate one example of a transportation-matching platform 800 that functions to match individuals interested in obtaining transportation from one location to another with vehicles that can provide such transportation. As shown, transportation-matching platform 800 may include at its core a transportation-matching system 801, which may be communicatively coupled via a communication network 806 to (i) a plurality of client stations of individuals interested in transportation (i.e., "transportation requestors"), of which client station 802 of transportation requestor 803 is shown as one representative example, (ii) a plurality of vehicles that are capable of providing the requested transportation, of which vehicle 804 is shown as one representative example, and (iii) a plurality of third-party systems that are capable of providing respective sub-services that facilitate the platform's transportation matching, of which third-party system 805 is shown as one representative example.

Broadly speaking, transportation-matching system 801 may include one or more computing systems that collectively comprise a communication interface, at least one processor, data storage, and executable program instructions for carrying out functions related to managing and facilitating transportation matching. These one or more computing systems may take various forms and be arranged in various manners. For instance, as one possibility, transportation-matching system 801 may comprise computing infrastructure of a public, private, and/or hybrid cloud (e.g., computing and/or storage clusters). In this respect, the entity that owns and operates transportation-matching system 801 may either supply its own cloud infrastructure or may obtain the cloud infrastructure from a third-party provider of "on demand" computing resources, such as Amazon Web Services (AWS), Microsoft Azure, Google Cloud, Alibaba Cloud, or the like. As another possibility, transportation-matching system 801 may comprise one or more dedicated servers. Other implementations of transportation-matching system 801 are possible as well.

As noted, transportation-matching system 801 may be configured to perform functions related to managing and facilitating transportation matching, which may take various forms. For instance, as one possibility, transportation-matching system 801 may be configured to receive transportation requests from client stations of transportation requestors (e.g., client station 802 of transportation requestor 803) and then fulfill such transportation requests by dispatching suitable vehicles, which may include vehicle 804. In this respect, a transportation request from client station 802 of transportation requestor 803 may include various types of information.

For example, a transportation request from client station 802 of transportation requestor 803 may include specified pick-up and drop-off locations for the transportation. As another example, a transportation request from client station 802 of transportation requestor 803 may include an identifier that identifies transportation requestor 803 in transportation-matching system 801, which may be used by transportation-matching system 801 to access information about transportation requestor 803 (e.g., profile information) that is stored in one or more data stores of transportation-matching system 801 (e.g., a relational database system), in accordance with the transportation requestor's privacy settings. This transportation requestor information may take various forms, examples of which include profile information about transportation requestor 803. As yet another example, a transportation request from client station 802 of transportation requestor 803 may include preferences information for transportation requestor 803, examples of which may include vehicle-operation preferences (e.g., safety comfort level, preferred speed, rates of acceleration or deceleration, safety distance from other vehicles when traveling at various speeds, route, etc.), entertainment preferences (e.g., preferred music genre or playlist, audio volume, display brightness, etc.), temperature preferences, and/or any other suitable information.

As another possibility, transportation-matching system 801 may be configured to access information related to a requested transportation, examples of which may include information about locations related to the transportation, traffic data, route options, optimal pick-up or drop-off locations for the transportation, and/or any other suitable information associated with requested transportation. As an example and not by way of limitation, when transportation-matching system 801 receives a request for transportation from San Francisco International Airport (SFO) to Palo Alto, Calif., transportation-matching system 801 may access or generate any relevant information for this particular transportation request, which may include preferred pick-up locations at SFO, alternate pick-up locations in the event that a pick-up location is incompatible with the transportation requestor (e.g., the transportation requestor may be disabled and cannot access the pick-up location) or the pick-up location is otherwise unavailable due to construction, traffic congestion, changes in pick-up/drop-off rules, or any other reason, one or more routes to travel from SFO to Palo Alto, preferred off-ramps for a type of transportation requestor, and/or any other suitable information associated with the transportation.

In some embodiments, portions of the accessed information could also be based on historical data associated with historical transportation facilitated by transportation-matching system 801. For example, historical data may include aggregate information generated based on past transportation information, which may include any information described herein and/or other data collected by sensors affixed to or otherwise located within vehicles (including sensors of other computing devices that are located in the vehicles such as client stations). Such historical data may be associated with a particular transportation requestor (e.g., the particular transportation requestor's preferences, common routes, etc.), a category/class of transportation requestors (e.g., based on demographics), and/or all transportation requestors of transportation-matching system 801.

For example, historical data specific to a single transportation requestor may include information about past rides that a particular transportation requestor has taken, including the locations at which the transportation requestor is picked up and dropped off, music the transportation requestor likes to listen to, traffic information associated with the rides, time of day the transportation requestor most often rides, and any other suitable information specific to the transportation requestor. As another example, historical data associated with a category/class of transportation requestors may include common or popular ride preferences of transportation requestors in that category/class, such as teenagers preferring pop music, transportation requestors who frequently commute to the financial district may prefer to listen to the news, etc. As yet another example, historical data associated with all transportation requestors may include general usage trends, such as traffic and ride patterns.

Using such historical data, transportation-matching system 801 could be configured to predict and provide ride suggestions in response to a transportation request. For instance, transportation-matching system 801 may be configured to apply one or more machine-learning techniques to such historical data in order to "train" a machine-learning model to predict ride suggestions for a transportation request. In this respect, the one or more machine-learning techniques used to train such a machine-learning model may take any of various forms, examples of which may include a regression technique, a neural-network technique, a k-Nearest Neighbor (kNN) technique, a decision-tree technique, a support-vector-machines (SVM) technique, a Bayesian technique, an ensemble technique, a clustering technique, an association-rule-learning technique, and/or a dimensionality-reduction technique, among other possibilities.

In operation, transportation-matching system 801 may only be capable of storing and later accessing historical data for a given transportation requestor if the given transportation requestor previously decided to "opt-in" to having such information stored. In this respect, transportation-matching system 801 may maintain respective privacy settings for each transportation requestor that uses transportation-matching platform 800 and operate in accordance with these settings. For instance, if a given transportation requestor did not opt-in to having his or her information stored, then transportation-matching system 801 may forgo performing any of the above-mentioned functions based on historical data. Other possibilities also exist.

Transportation-matching system 801 may be configured to perform various other functions related to managing and facilitating transportation matching as well.

Referring again to FIG. 8, client station 802 of transportation requestor 803 may generally comprise any computing device that is configured to facilitate interaction between transportation requestor 803 and transportation-matching system 801. For instance, client station 802 may take the form of a smartphone, a tablet, a desktop computer, a laptop, a netbook, and/or a PDA, among other possibilities. Each such device may comprise an I/O interface, a communication interface, a GNSS unit such as a GPS unit, at least one processor, data storage, and executable program instructions for facilitating interaction between transportation requestor 803 and transportation-matching system 801 (which may be embodied in the form of a software application, such as a mobile application, web application, or the like). In this respect, the interaction that may take place between transportation requestor 803 and transportation-matching system 801 may take various forms, representative examples of which may include requests by transportation requestor 803 for new transportation events, confirmations by transportation-matching system 801 that transportation requestor 803 has been matched with a vehicle (e.g., vehicle 804), and updates by transportation-matching system 801 regarding the progress of the transportation event, among other possibilities.

In turn, vehicle 804 may generally comprise any kind of vehicle that can provide transportation, and in one example, may take the form of AV 600 described above. Further, the functionality carried out by vehicle 804 as part of transportation-matching platform 800 may take various forms, representative examples of which may include receiving a request from transportation-matching system 801 to handle a new transportation event, driving to a specified pickup location for a transportation event, driving from a specified pickup location to a specified drop-off location for a transportation event, and providing updates regarding the progress of a transportation event to transportation-matching system 801, among other possibilities.

Generally speaking, third-party system 805 may include one or more computing systems that collectively comprise a communication interface, at least one processor, data storage, and executable program instructions for carrying out functions related to a third-party subservice that facilitates the platform's transportation matching. These one or more computing systems may take various forms and may be arranged in various manners, such as any one of the forms and/or arrangements discussed above with reference to transportation-matching system 801.

Moreover, third-party system 805 may be configured to perform functions related to various subservices. For instance, as one possibility, third-party system 805 may be configured to monitor traffic conditions and provide traffic data to transportation-matching system 801 and/or vehicle 804, which may be used for a variety of purposes. For example, transportation-matching system 801 may use such data to facilitate fulfilling transportation requests in the first instance and/or updating the progress of initiated transportation events, and vehicle 804 may use such data to facilitate updating certain predictions regarding perceived agents and/or the vehicle's behavior plan, among other possibilities.

As another possibility, third-party system 805 may be configured to monitor weather conditions and provide weather data to transportation-matching system 801 and/or vehicle 804, which may be used for a variety of purposes. For example, transportation-matching system 801 may use such data to facilitate fulfilling transportation requests in the first instance and/or updating the progress of initiated transportation events, and vehicle 804 may use such data to facilitate updating certain predictions regarding perceived agents and/or the collection vehicle's behavior plan, among other possibilities.

As yet another possibility, third-party system 805 may be configured to authorize and process electronic payments for transportation requests. For example, after transportation requestor 803 submits a request for a new transportation event via client station 802, third-party system 805 may be configured to confirm that an electronic payment method for transportation requestor 803 is valid and authorized and then inform transportation-matching system 801 of this confirmation, which may cause transportation-matching system 801 to dispatch vehicle 804 to pick up transportation requestor 803. After receiving a notification that the transportation event is complete, third-party system 805 may then charge the authorized electronic payment method for transportation requestor 803 according to the fare for the transportation event. Other possibilities also exist.

Third-party system 805 may be configured to perform various other functions related to subservices that facilitate the platform's transportation matching as well. It should be understood that, although certain functions were discussed as being performed by third-party system 805, some or all of these functions may instead be performed by transportation-matching system 801.

As discussed above, transportation-matching system 801 may be communicatively coupled to client station 802, vehicle 804, and third-party system 805 via communication network 806, which may take various forms. For instance, at a high level, communication network 806 may include one or more Wide-Area Networks (WANs) (e.g., the Internet or a cellular network), Local-Area Networks (LANs), and/or Personal Area Networks (PANs), among other possibilities, where each such network may be wired and/or wireless and may carry data according to any of various different communication protocols. Further, it should be understood that the respective communication paths between the various entities of FIG. 8 may take other forms as well, including the possibility that such communication paths include communication links and/or intermediate devices that are not shown.

In the foregoing arrangement, client station 802, vehicle 804, and/or third-party system 805 may also be capable of indirectly communicating with one another via transportation-matching system 801. Additionally, although not shown, it is possible that client station 802, vehicle 804, and/or third-party system 805 may be configured to communicate directly with one another as well (e.g., via a short-range wireless communication path or the like). Further, vehicle 804 may also include a user-interface system that may facilitate direct interaction between transportation requestor 803 and vehicle 804 once transportation requestor 803 enters vehicle 804 and the transportation event begins.

It should be understood that transportation-matching platform 800 may include various other entities and take various other forms as well.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and spirit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

What is claimed is:

1. A method comprising:
    while a vehicle is operating in a geographic area, identifying a set of path priors to use as a basis for deriving a planned path for the vehicle in the geographic area, wherein the set of path priors corresponds to paths traversed in the geographic area prior to the vehicle operating in the geographic area and include road segments filtered according to trajectory poses;
    sampling the road segments individually within the set of path priors to produce a set of points that are representative of the set of path priors, and that includes increasing a number of samples according to a complexity of road geometry associated with the road segments that is associated with reduced safety;
    fitting a curve to the set of points;
    deriving the planned path for the vehicle based on the curve; and
    controlling the vehicle according to the planned path.

2. The method of claim 1, wherein identifying the set of path priors to use as a basis for deriving the planned path for the vehicle in the geographic area comprises:
    selecting a sequence of the road segments that the planned path is to traverse;
    identifying a respective subset of path priors associated with each road segment in the sequence of the road segments; and
    combining respective subsets of path priors associated with the road segments in the sequence into the set of path priors.

3. The method of claim 1, wherein fitting the curve to the set of points comprises:
    fitting the curve to the set of points to achieve a balance between minimizing a deviation from the set of points and minimizing a curvature of the curve.

4. The method of claim 1, wherein the curve comprises a cubic smoothing spline.

5. The method of claim 1, further comprising:
    before sampling path priors in the set of path priors, filtering the set of path priors based on a comparison between contextual information related to the path priors in the set of path priors and contextual information related to operation of the vehicle, and wherein sampling the path priors in the set of path priors comprises sampling remaining path priors that remain in the set of path priors after the filtering.

6. The method of claim 5, wherein filtering the set of path priors comprises:
    obtaining data related to the operation of the vehicle for at least one given contextual variable;
    for each path prior in the set of path priors:
        accessing metadata for the at least one given contextual variable,
        comparing the metadata to the data related to the operation of the vehicle for the at least one given contextual variable, and
        identifying a path prior for removal if there is a mismatch between the metadata and the data related to the operation of the vehicle for the at least one given contextual variable; and
    removing each path prior identified for removal from the set of path priors.

7. The method of claim 6, wherein the at least one given contextual variable relates to one of time-of-day, date, weather conditions, traffic conditions, school-zone state, or geometry of an applicable sequence of the road segments.

8. The method of claim 1, wherein sampling the road segments individually within the set of path priors comprises:
    using a sampling scheme that involves dynamically selecting a sampling rate to apply to each path prior in the set of path priors based on contextual information related to operation of the vehicle.

9. The method of claim 8, wherein the contextual information related to the operation of the vehicle comprises one or more of time-of-day, date, weather conditions, traffic conditions, school-zone state, or geometry of an applicable sequence of the road segments.

10. The method of claim 1, wherein sampling the road segments individually within the set of path priors comprises:
    using a sampling scheme that involves dynamically selecting a sampling rate to apply to each respective path prior in the set of path priors based on information related to a respective path prior that comprises one or more of a geometry of a road segment that corresponds to the respective path prior, contextual information for the respective path prior, or a confidence level associated with the respective path prior.

11. The method of claim 1, wherein identifying the set of path priors comprises defining path priors, and wherein the path priors are encoded into map data for the geographic area.

12. A non-transitory computer-readable medium comprising executable program instructions for:
    while a vehicle is operating in a geographic area, identifying a set of path priors to use as a basis for deriving a planned path for the vehicle in the geographic area, wherein the set of path priors corresponds to paths traversed in the geographic area prior to the vehicle operating in the geographic area and include road segments filtered according to trajectory poses;
    sampling the road segments individually within the set of path priors to produce a set of points that are representative of the set of path priors, and that includes increasing a number of samples according to a complexity of road geometry associated with the road segments that is associated with reduced safety;

fitting a curve to the set of points;

deriving the planned path for the vehicle based on the curve; and controlling the vehicle according to the planned path.

13. The non-transitory computer-readable medium of claim 12, wherein identifying the set of path priors to use as the basis for deriving the planned path for the vehicle in the geographic area comprises:

selecting a sequence of the road segments that the planned path is to traverse;

identifying a respective subset of path priors associated with each road segment in the sequence of the road segments; and combining respective subsets of path priors associated with the road segments in the sequence into the set of path priors.

14. The non-transitory computer-readable medium of claim 12, wherein fitting the curve to the set of points comprises:

fitting the curve to the set of points to achieve a balance between minimizing a deviation from the set of points and minimizing a curvature of the curve.

15. The non-transitory computer-readable medium of claim 14, wherein the curve comprises a cubic smoothing spline.

16. The non-transitory computer-readable medium of claim 12, further comprising executable program instructions for:

before sampling path priors in the set of path priors, filtering the set of path priors based on a comparison between contextual information related to the path priors in the set of path priors and contextual information related to operation of the vehicle in the geographic area, and wherein sampling the path priors in the set of path priors comprises sampling remaining path priors in the set of path priors after the filtering.

17. The non-transitory computer-readable medium of claim 16, wherein filtering the set of path priors comprises:

obtaining data related to the operation of the vehicle for at least one given contextual variable;

for each path prior in the set of path priors:

accessing metadata for the at least one given contextual variable, comparing the metadata to the data related to the operation of the vehicle for the at least one given contextual variable, and identifying a path prior for removal if there is a mismatch between the metadata and the data related to the operation of the vehicle for the at least one given contextual variable; and removing each path prior identified for removal from the set of path priors.

18. The non-transitory computer-readable medium of claim 17, wherein the at least one given contextual variable relates to one of time-of-day, date, weather conditions, traffic conditions, school-zone state, or a geometry of an applicable sequence of the road segments.

19. The non-transitory computer-readable medium of claim 12, wherein sampling the road segments individually within the set of path priors comprises:

using a sampling scheme that involves dynamically selecting a sampling rate to apply to each respective path prior in the set of path priors based on contextual information related to operation of the vehicle.

20. A computing system comprising:

at least one processor;

a non-transitory computer-readable medium; and program instructions stored on the non-transitory computer-readable medium that are executable by the at least one processor such that the computing system is capable of:

while a vehicle is operating in a geographic area, identifying a set of path priors to use as a basis for deriving a planned path for the vehicle in the geographic area, wherein the set of path priors corresponds to paths traversed in the geographic area prior to the vehicle operating in the geographic area and include road segments filtered according to trajectory poses;

sampling the road segments individually within the set of path priors to produce a set of points that are representative of the set of path priors, and that includes increasing a number of samples according to a complexity of road geometry associated with the road segments that is associated with reduced safety;

fitting a curve to the set of points;

deriving the planned path for the vehicle based on the curve; and controlling the vehicle according to the planned path.

* * * * *

UNITED STATES PATENT AND TRADEMARK OFFICE
CERTIFICATE OF CORRECTION

PATENT NO. : 11,604,075 B2
APPLICATION NO. : 16/835078
DATED : March 14, 2023
INVENTOR(S) : Sasanka Nagavalli et al.

It is certified that error appears in the above-identified patent and that said Letters Patent is hereby corrected as shown below:

In the Specification

In Column 7, Line 38, please add "the" after "carry out".
In Column 7, Line 48, please add "be" after "which may".
In Column 7, Line 65, please remove "of" after "part" and replace with "on".
In Column 28, Line 5, please remove "that" after "instructions that".

Signed and Sealed this
Eleventh Day of April, 2023

Katherine Kelly Vidal
*Director of the United States Patent and Trademark Office*